US010759062B2

(12) United States Patent
Ma et al.

(10) Patent No.: US 10,759,062 B2
(45) Date of Patent: Sep. 1, 2020

(54) ARTICLE OF DISHWARE GRIPPING SYSTEMS

(71) Applicant: Dishcraft Robotics, Inc., San Carlos, CA (US)

(72) Inventors: Kevin Ma, Milpitas, CA (US); Paul M. Birkmeyer, San Carlos, CA (US); Kent Anderson, Redwood City, CA (US); Stephen Morfey, Bradford-on-Avon (GB)

(73) Assignee: Dishcraft Robotics, Inc., San Carlos, CA (US)

( * ) Notice: Subject to any disclaimer, the term of this patent is extended or adjusted under 35 U.S.C. 154(b) by 0 days.

(21) Appl. No.: 15/836,591

(22) Filed: Dec. 8, 2017

(65) Prior Publication Data

US 2019/0176346 A1 Jun. 13, 2019

(51) Int. Cl.
| | |
|---|---|
| *B25J 15/08* | (2006.01) |
| *B25J 15/10* | (2006.01) |
| *B25J 15/00* | (2006.01) |
| *B25J 19/04* | (2006.01) |
| *B25J 15/02* | (2006.01) |
| *B25J 19/02* | (2006.01) |
| *A47L 15/42* | (2006.01) |

(52) U.S. Cl.
CPC ......... *B25J 15/083* (2013.01); *B25J 15/0014* (2013.01); *B25J 15/0028* (2013.01); *B25J 15/0033* (2013.01); *B25J 15/022* (2013.01); *B25J 15/086* (2013.01); *B25J 15/10* (2013.01); *B25J 15/106* (2013.01); *B25J 19/023* (2013.01); *B25J 19/04* (2013.01); *A47L 15/42* (2013.01); *A47L 2401/04* (2013.01); *A47L 2501/36* (2013.01)

(58) Field of Classification Search
None
See application file for complete search history.

(56) References Cited

U.S. PATENT DOCUMENTS

| | | | |
|---|---|---|---|
| 4,579,380 A | | 4/1986 | Zaremsky et al. |
| 5,200,679 A | * | 4/1993 | Graham ............... B25J 15/0009 294/111 |
| 5,588,688 A | | 12/1996 | Jacobsen et al. |

(Continued)

FOREIGN PATENT DOCUMENTS

| | | |
|---|---|---|
| EP | 0858866 A1 | 8/1998 |
| WO | WO2016037288 A1 | 3/2016 |

OTHER PUBLICATIONS

Gareth J. Monkman et al., Robot Grippers. Weinheim: Wiley-VCH, 2007, ISBN 978-3-527-40619-7.

*Primary Examiner* — Gerald McClain
(74) *Attorney, Agent, or Firm* — Loza & Loza, LLP

(57) ABSTRACT

Example systems and methods are described that are capable of gripping objects. In one implementation, a system includes a first finger that includes a plurality of teeth and a second finger that is mechanically coupled to the first finger and includes a plurality of teeth. The first finger and the second finger are configured to move apart when the first finger and the second finger are moved in a first direction against an object. The first finger and second finger are further configured to grip the object when the first finger and the second finger are moved in a second direction that is substantially opposite to the first direction.

25 Claims, 15 Drawing Sheets

(56) References Cited

U.S. PATENT DOCUMENTS

| | | | |
|---|---|---|---|
| 6,155,773 A | 12/2000 | Ebbing | |
| 6,817,640 B2 | 11/2004 | Menon | |
| 7,410,472 B2 | 8/2008 | Yakimovich et al. | |
| 7,904,198 B2 | 3/2011 | Hawes | |
| 8,720,964 B2 | 5/2014 | Birglen | |
| 8,833,826 B2 | 9/2014 | Garcia | |
| 8,833,827 B2 * | 9/2014 | Ciocarlie | B25J 15/08 294/111 |
| 8,840,160 B2 * | 9/2014 | Caron L'Ecuyer | A61F 2/586 294/106 |
| 9,446,513 B2 | 9/2016 | Ekas | |
| 9,579,219 B2 | 2/2017 | Amend, Jr. | |
| 2010/0054903 A1 | 3/2010 | Jones | |
| 2010/0181792 A1 | 7/2010 | Birglen | |
| 2011/0133502 A1 * | 6/2011 | Koyama | B25J 15/0009 294/106 |
| 2012/0059517 A1 | 3/2012 | Nomura | |
| 2013/0106127 A1 | 5/2013 | Lipson | |
| 2014/0035306 A1 | 2/2014 | Garcia et al. | |
| 2014/0097631 A1 * | 4/2014 | Ciocarlie | B25J 15/08 294/198 |
| 2014/0126990 A1 | 5/2014 | Manes | |
| 2015/0239713 A1 | 8/2015 | Ward | |
| 2017/0355082 A1 * | 12/2017 | Youmans | B25J 15/12 |
| 2018/0117773 A1 * | 5/2018 | Odhner | B25J 15/0009 |
| 2018/0170676 A1 * | 6/2018 | Claretti | B23P 19/007 |
| 2019/0176348 A1 * | 6/2019 | Bingham | B25J 9/1035 |
| 2019/0291269 A1 * | 9/2019 | Ciocarlie | B25J 15/08 |

* cited by examiner

ARTICLE OF DISHWARE GRIPPING SYSTEMS

TECHNICAL FIELD

The present disclosure relates to systems and methods that use robotic manipulators or robotic actuators in association with grippers to manipulate objects.

BACKGROUND

In many situations, a robotic actuator is useful for moving objects between two locations. The process of automating movement of objects between locations involves the need to manipulate the objects, which includes properly grasping or gripping an object, moving the object, and releasing the object at a destination. In some situations, gripping an object is difficult due to the object's placement, position, shape, weight, and so forth. In these situations, a gripper may be useful in establishing and maintaining a strong grip on the object. There exists a need, therefore, for an object gripping system that includes a gripper to make manipulation of the object easier by the robotic actuator.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
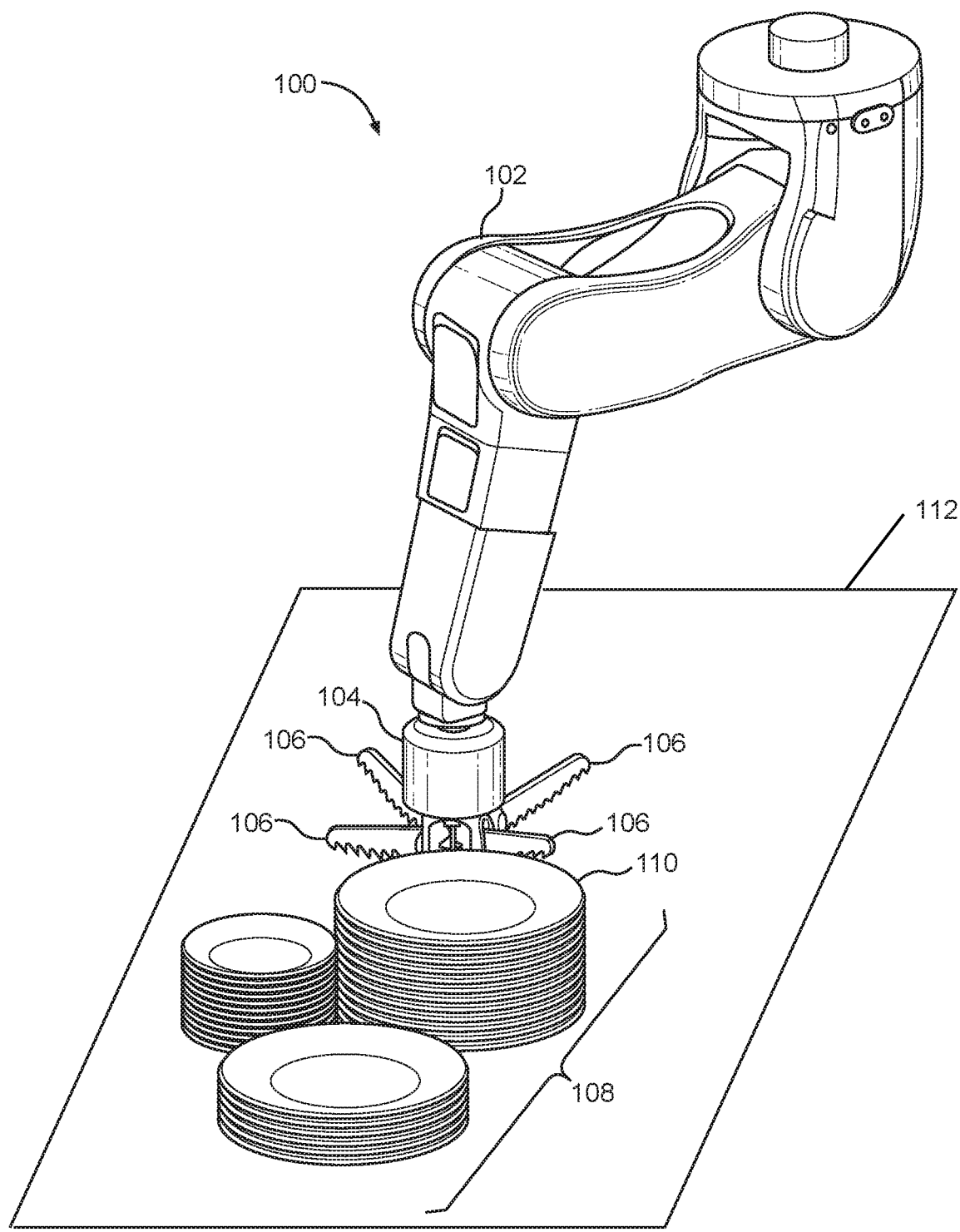
FIG. 1 is a schematic diagram depicting an embodiment of an object gripping system configured to grip and manipulate objects.

In the following disclosure, reference is made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter is described in language specific to structural features and/or methodological acts, it is to be understood that the subject matter defined in the appended claims is not necessarily limited to the described features or acts described herein. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed herein may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure are directed to computer program products comprising such logic (e.g., in the form of software) stored on any computer useable medium. Such software, when executed in one or more data processing devices, causes a device to operate as described herein.

The systems and methods described herein use a robotic system to manipulate objects such as articles of dishware. In some embodiments, the robotic system includes a robot or robotic actuator, a gripper, a processing system, and a sensing system. The gripper is configured with two or more fingers, where each finger includes a plurality of teeth that are used to grip an object. The fingers are locked in a gripped position and the object is moved from a first location to a second location, where the lock on the fingers is released and the object is deposited at the second location. The robotic system may be used to move any type of object or item in any environment.

FIG. 1 is a schematic diagram depicting an embodiment of an object gripping system 100 configured to grip and manipulate objects. In some embodiments, object gripping system 100 includes a robotic actuator 102 that is mechanically coupled to a gripper 104. In some embodiments, gripper 104 may also be referred to as a "grasper," and the terms "grip" and "gripping" may be used interchangeably with "grasp" and "grasping" respectively. The combination of robotic actuator 102 and gripper 104 may be controlled by, for example, a processing system (not shown in FIG. 1, but described herein).

In some embodiments, gripper 104 may include a plurality of fingers (i.e., at least two fingers) 106 that are configured to wrap around or engage an object to be gripped. In particular embodiments, each finger 106 may include a plurality of teeth, teeth-like structures, or hooks that are configured to grip or engage an object in a manner similar to a ratcheting device. Details of the construction of gripper 104 and the associated gripping process are provided herein.

In some embodiments, the combination of robotic actuator 102 and gripper 104 may be commanded by a processing system to grip an object 110. In particular embodiments, object 110 may be one of a collection of objects such as a stack of articles of dishware 108 that rests on a work surface 112. In other embodiments, the object to be gripped may be a standalone item. In some embodiments, an object to be gripped by object gripping system 100 may include articles with peripheral rim-like edges, such as articles of dishware, including plates and bowls, as well as objects such as pans, trays, wafers, flat plates, etc.

In some embodiments, the process of gripping and manipulating object 110 includes the following steps:

The combination of robotic actuator 102 and gripper 104 is moved towards object 110 to be gripped and manipulated.

Fingers 106 of gripper 104 wrap around object 110. In some embodiments, each finger 106 may have a pivoted end proximate to robotic actuator 102 and a free distal end. This arrangement allows the fingers 106 to collectively wrap around and engage object 110 to be gripped.

One or more teeth in each of the fingers 106 engage with a feature in object 110 (e.g., a peripheral rim or edge of object 110).

Fingers 106 are locked by a locking mechanism that may include a mechanical clutch—this completes the gripping process.

The combination of robotic actuator 102 and gripper 104 lifts object 110—this process may generate additional gripping forces to strengthen the grip of gripper 104 on object 110.

The combination of robotic actuator 102 and gripper 104 manipulates object 110 (e.g., moves object 110 from a first location to a second location).

The locking mechanism is unlocked so that fingers 106 release the grip on the object and object 110 is released.

In some embodiments, gripper 104 may be described as a passive gripper that is configured to grip object 110 using forces generated by a combination of gravity, compliant members such as springs that are a part of the gripper, and the weight of the object. In other embodiments, gripper 104 may be described as an active gripper that is configured to grip an object using forces generated by actuators such as pneumatic pistons, electric motors, solenoids, hydraulic cylinders, or phase change materials (such as electro-active polymers, shape memory alloy, piezoelectric actuators, etc.). Examples and operational details of both passive grippers and active grippers are provided herein.

In some embodiments, gripper 104 may be interchangeable from a different grippers, where each gripper may be configured to perform different functions or grip different kinds of objects. For example, one gripper may be configured to grip and manipulate plates, while another gripper may be configured to grip and manipulate bowls. In particular embodiments, the fingers associated with gripper 104 may be removable (or replaceable) independently of other fingers associated with gripper 104. For example, a finger may need to be removed for cleaning, or a finger may be worn out and may need replacing, or a finger with a specific geometry (e.g., tooth structure) may be needed for a specific application.

The plurality of teeth on each finger associated with gripper 104 allows gripper 104 to engage objects of varying sizes while allowing for a greater tolerance for error in the positioning accuracy of gripper 104 with respect to an object to be gripped. In the event that the objects are articles of dishware, the plurality of teeth allows object gripping system 100 to accommodate different dish sizes.

Figure 2A:
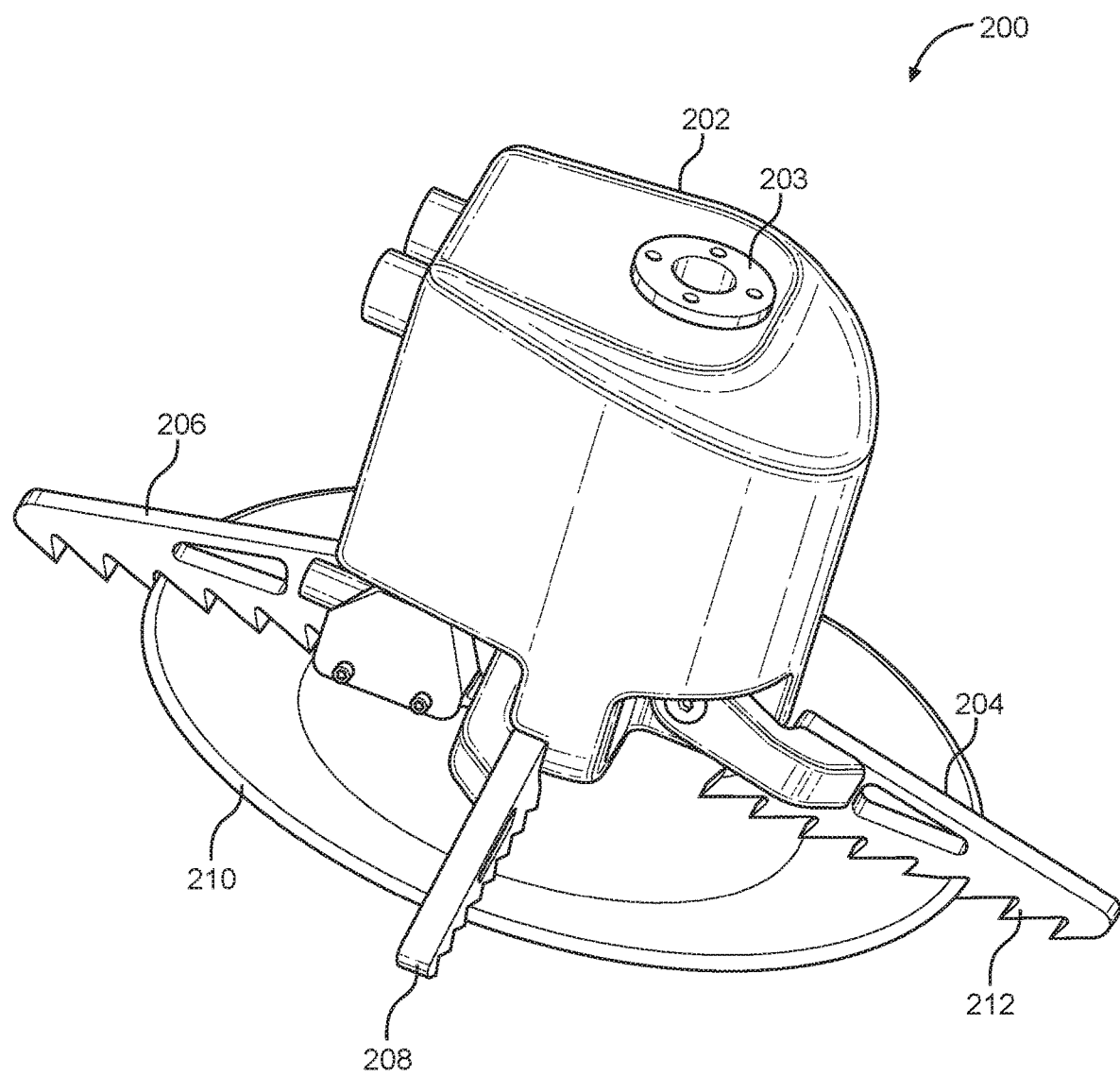
FIG. 2A is a schematic diagram depicting an isometric view of an embodiment of a passive gripper.

FIG. 2A is a schematic diagram depicting an isometric view of an embodiment of a passive gripper 200. In some embodiments, passive gripper 200 includes a housing 202 that contains mechanical elements associated with passive gripper 200, for example spring mechanisms, pivots, locking mechanisms, and rigid support structures. These mechanical elements serve to mechanically couple the plurality of fingers associated with passive gripper 200; these mechanical elements together comprise what is referred to as a "mechanical coupling." For example, a rigid support structure may form the basis for a rigid mechanical reference for any motion of any fingers associated with passive gripper 200. These fingers may be configured to move around one or more pivots. Spring mechanisms are an integral part of an embodiment of a passive gripper, as discussed herein. Locking mechanisms serve to lock one or more fingers associated with passive gripper 200 in place when an object is being gripped by passive gripper 200. Examples of locking mechanisms include mechanical clutches, as discussed herein. Housing 202 also includes a mechanical coupling interface 203 that allows passive gripper 200 to be mechanically coupled to a robotic actuator such as robotic actuator 102.

In some embodiments, passive gripper 200 may include a plurality of fingers such as a finger 204, a finger 206, and a finger 208. Additional fingers may be associated with passive gripper 200 that are not visible in FIG. 2A as they might be concealed behind housing 202 in the isometric view presented in FIG. 2A. Each of finger 204-208 may include a plurality of teeth or teeth-like structures. For example, a tooth 212 is shown on finger 204. Each of the fingers 204-208 associated with passive gripper 200 in conjunction with the corresponding teeth is configured to grip an object, as discussed herein. FIG. 2A depicts passive gripper 200 gripping an object 210 (an article of dishware in this example) using at least a combination of fingers 204-208. Object 210 is shown to be gripped by each tooth associated with fingers 204-208.

Figure 2B:
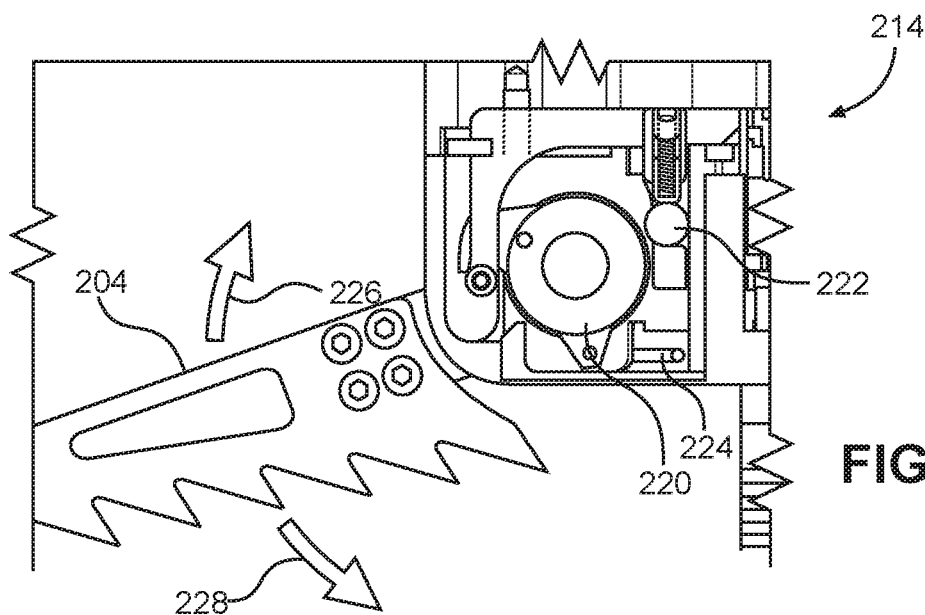
FIG. 2B is a schematic diagram depicting a first state in a sequence of operations associated with gripping an object by an embodiment of a passive gripper.

FIG. 2B is a schematic diagram depicting a first state 214 in a sequence of operations associated with gripping an object by an embodiment of a passive gripper such as passive gripper 200. First state 214 depicts a portion of passive gripper 200; specifically, first state 214 depicts a portion of finger 204 along with internal components of passive gripper 200 that are associated with finger 204. (These internal components are totally or partially concealed within housing 202 in FIG. 2A.) Finger 204 is configured to rotate about a pivot 220. The corresponding directions of rotation of finger 204 are a first rotation direction 226 and a second rotation direction 228. At equilibrium when finger 204 is not involved in gripping an object, finger 204 is at a rest position where the weight of finger 204 is balanced by tension in a spring 224. In this sense, spring 224 can be viewed as a spring mechanism that is coupled to finger 204. First state 214 also depicts a roller clutch 222 that is configured to lock finger 204 such that motion of finger 204 is constrained. In first state 214, roller clutch 222 is shown to be disengaged; finger 204 is thus able to move in either first rotation direction 226 or second rotation direction 228 under the application of an external force. When this external force is removed, finger 204 returns to its rest position at equilibrium based on the mechanical interaction between the weight of finger 204 and the tension in spring 224. Other fingers associated with passive gripper 200 may be associated with similar mechanical coupling and functionality as finger 204, including a separate spring mechanism (such as spring 224) associated with each finger.

In some embodiments, the fingers associated with a passive gripper such as passive gripper 200 move independently of one another. For example, a force applied to move finger 204 would not have any effect on finger 206 or finger 208 in terms of initiating any motion in either of finger 206 or finger 208. The fingers associated with passive gripper 200 are thus subject to a mechanical coupling with independent motion of the fingers. A further description of passive gripping is described herein.

Figure 2C:
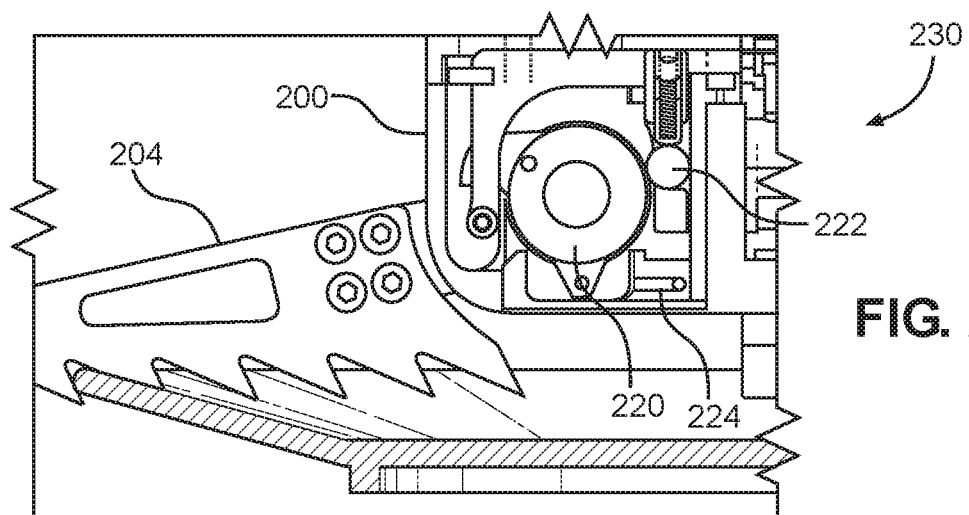
FIG. 2C is a schematic diagram depicting a second state in a sequence of operations associated with gripping an object by an embodiment of a passive gripper.

FIG. 2C is a schematic diagram depicting a second state 230 in a sequence of operations associated with gripping an object by an embodiment of a passive gripper such as passive gripper 200. In second state 230, continuing from first state 214, passive gripper 200 is shown to be in the process of gripping a portion of an object 232. The portion of object 232 is shown to be gripped by a tooth 233 associated with finger 204; other teeth associated with other fingers also grip different portions of object 232 (not depicted in second state 230). Second state 320 shows tooth 233 engaged with an edge of object 232. Roller clutch 222 is disengaged in second state 230, while spring 224 exerts tension to balance the weight of finger 204 and any added force on finger 204 due to object 232. In this sense, the tension exerted by spring 224 serves to enhance the grip exerted by finger 204 on object 232. (Similar springs associated with other fingers similarly serve to enhance a grip exerted by the respective finger on object 232.) Second state also depicts pivot 220.

Figure 2D:
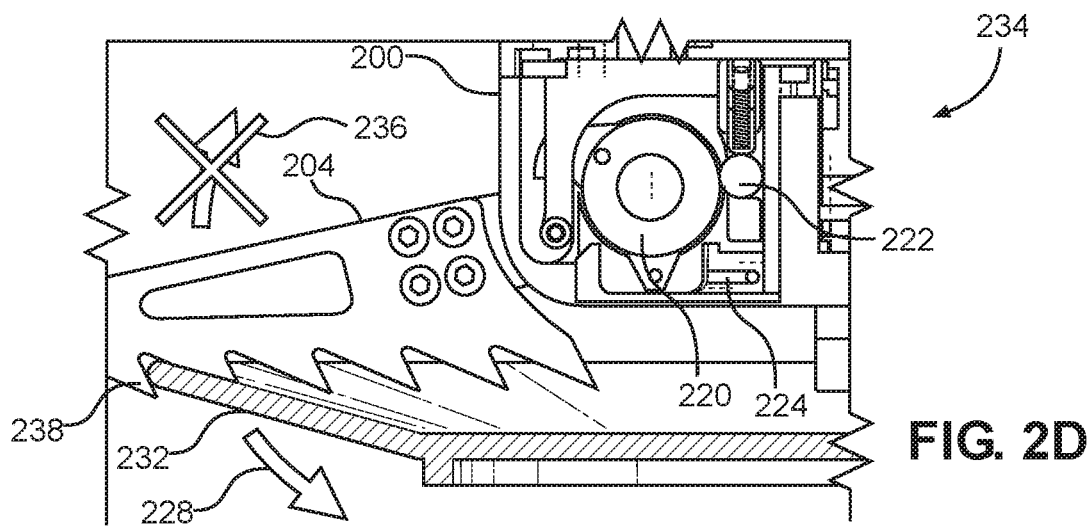
FIG. 2D is a schematic diagram depicting a third state in a sequence of operations associated with gripping an object by an embodiment of a passive gripper.

FIG. 2D is a schematic diagram depicting a third state 234 in a sequence of operations associated with gripping an object by an embodiment of a passive gripper such as passive gripper 200. Continuing from second state 230, roller clutch 222 is shown to be in a locked position. This prevents finger 204 from moving in a blocked direction of rotation 236 (originally first rotation direction 226). Finger 204 may still move in second rotation direction 228; however a physical constraint posed by object 232 may prevent any motion of finger 204 in second rotation direction 228 about pivot 220 or in any other direction. In some embodiments, finger 204 and other fingers associated with passive gripper 200 can be described as self-closing, as the teeth of the fingers associated with passive gripper 200 engage under a rim of the object to be gripped, and the associated weight of the object causes the fingers and associated teeth to increase the grip on the object. In particular embodiments, this is especially true when passive gripper 200 is lifted by a robotic actuator such as robotic actuator 102. This occurs due to the mechanical structure of passive gripper 200, to include fingers, teeth, and mechanical coupling components such as rigid supports, springs, pivots and so on.

In third state 234, finger 204 is substantially locked by a combination of roller clutch 222, the forces generated by the interaction between tooth 233 and object 232, and the rigid structure of finger 204. Similarly, any other finger associated with object 232 are locked by similar independent processes as described in the sequence of first state 214, second state 230, and third state 234. The net effect of all fingers being locked in this manner is that object 232 is gripped by passive gripper 200. Additional gripping forces may be generated by the fingers associated with passive gripper 200 when object 232 is lifted off of a work surface by passive gripper 200. The sequence of first state 214, second state 230, and third state 234 illustrates a passive gripping process. In summary, a passive gripping process involves at least two fingers and associated teeth engaging with an object to be gripped and a corresponding locking mechanism to help lock the fingers in place to help enhance the strength of the grip.

Figure 3A:
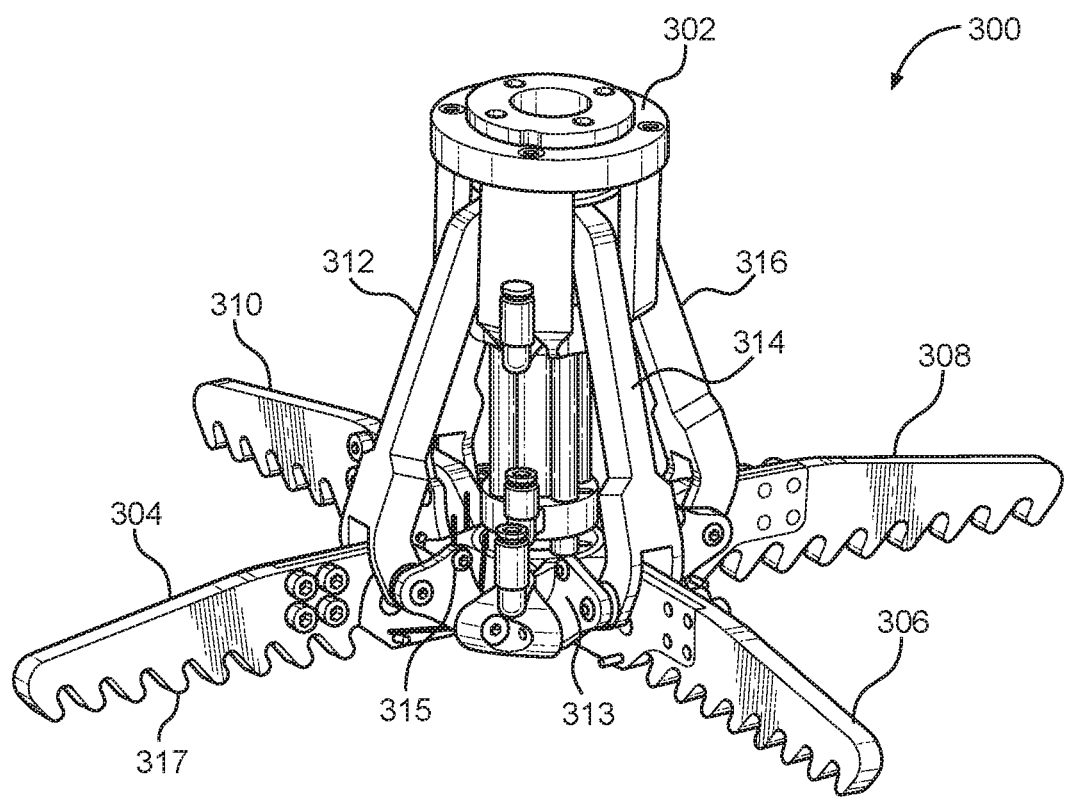
FIG. 3A is a schematic diagram depicting an isometric view of an embodiment of an active gripper.

FIG. 3A is a schematic diagram depicting an isometric view of an embodiment of an active gripper 300. In some embodiments, active gripper 300 comprises a mechanical coupling interface 302 that allows active gripper 300 to be mechanically coupled to a robotic actuator such as robotic actuator 102. Active gripper 300 also includes four fingers—a finger 304, a finger 306, a finger 308, and a finger 310. Each of finger 304-310 is mechanically coupled to a separate pivot; for example finger 304 is mechanically coupled to a pivot 315 while finger 306 is mechanically coupled to a pivot 313. Each of finger 304-310 is configured to rotate about its corresponding pivot upon the application of an external force. In some embodiments, each of finger 304-310 is configured with a plurality of teeth or teeth-like structures. For example, a tooth 317 is shown on finger 304. Each of finger 304-310 in association with the corresponding teeth is configured to grip an object, as discussed herein.

In some embodiments, each of finger 304-310 is mechanically coupled to a separate pneumatic actuator. For example, finger 304 is mechanically coupled to a pneumatic actuator 312, finger 306 is mechanically coupled to a pneumatic actuator 314, and finger 308 is mechanically coupled to a pneumatic actuator 316. In the isometric view presented in FIG. 3A, a pneumatic actuator associated with finger 310 is not visible. In some embodiments, each of pneumatic actuator 314 through pneumatic actuator 316 and the pneumatic actuator associated with finger 310 is mechanically coupled to mechanical coupling interface 302. In particular embodiments, each of pneumatic actuator 314-316 and the pneumatic actuator associated with finger 310 is configured to move the corresponding finger 304-310 respectively about its respective pivot by applying a force to each of the fingers. Details of the operation of active gripper 300 are provided herein.

Figure 3B:
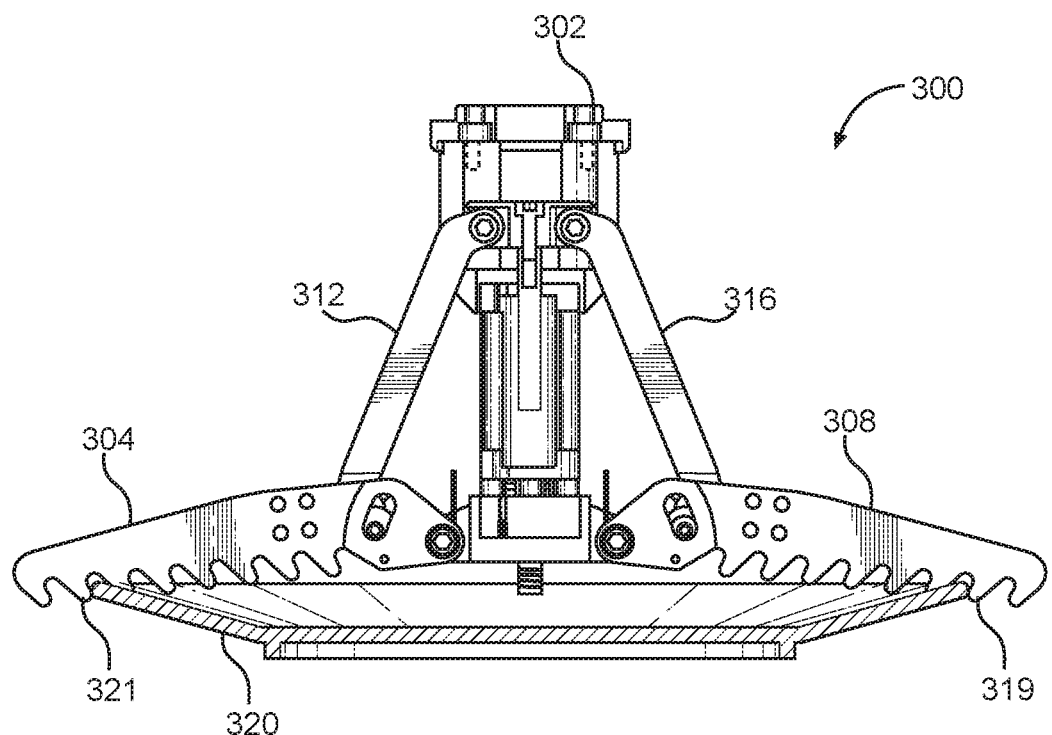
FIG. 3B is a schematic diagram depicting a view of an embodiment of an active gripper gripping an object.

FIG. 3B is a schematic diagram depicting a view of an embodiment of an active gripper such as active gripper 300 gripping an object 320. FIG. 3B depicts finger 304, finger 308, pneumatic actuator 312, and pneumatic actuator 316. Object 320 is shown to be gripped by a combination of a tooth 321 associated with finger 304 and a tooth 319 associated with finger 308. All the fingers and associated mechanisms of active gripper 300 collaboratively grip object 320.

Figure 3C:
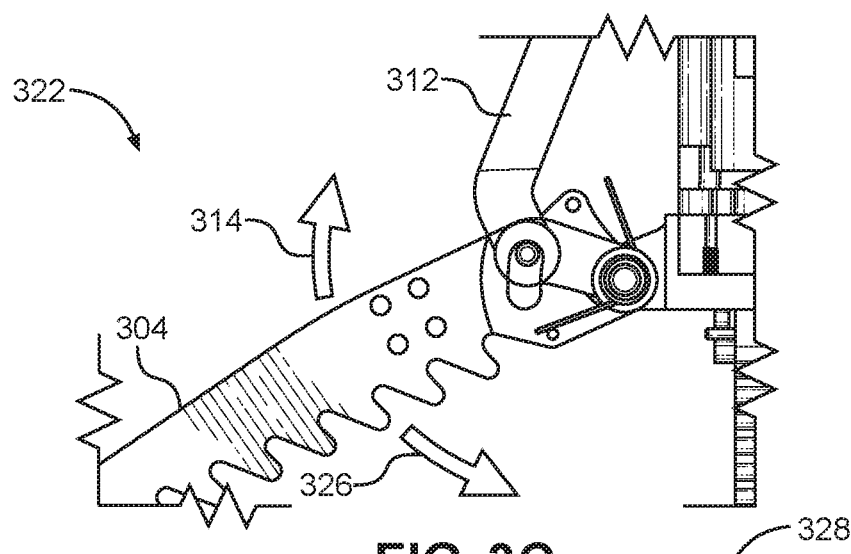
FIG. 3C is a schematic diagram depicting a first state in a sequence of operations associated with gripping an object by an embodiment of an active gripper.

FIG. 3C is a schematic diagram depicting a first state 322 in a sequence of operations associated with gripping an object by an embodiment of an active gripper such as active gripper 300. First state 322 depicts a portion of active gripper 300; specifically, first state 322 depicts a portion of finger 304 configured to rotate about pivot 315 in either a first rotation direction 324 or a second rotation direction 326 under, for example, the application of a force exerted by pneumatic actuator 312. In some embodiments, a degree of compliance may be built into an equilibrium state of finger 304, where some amount of spring-loaded motion may be possible about the equilibrium state of finger 304 as discussed for finger 204 associated with passive gripper 200. The discussion applied to finger 304 and the associated portion of active gripper 300 can be extended to other fingers associated with active gripper 300. Also shown in first state 322 is a torsion spring 323 that is configured to provide a locking force on finger 304 when an article is gripped. Additional details of this process are provided herein. In first state 322, torsion spring 323 is in a free state and is neither in tension or compression, and hence provides no significant force inputs to either finger 304 or any other part of active gripper 300.

Figure 3D:
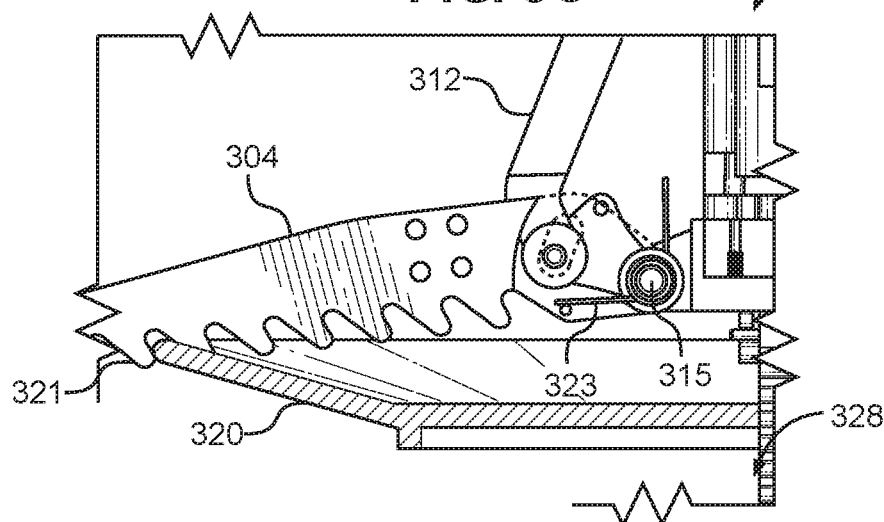
FIG. 3D is a schematic diagram depicting a second state in a sequence of operations associated with gripping an object by an embodiment of an active gripper.

FIG. 3D is a schematic diagram depicting a second state 328 in a sequence of operations associated with gripping an object by an embodiment of an active gripper such as active gripper 300. In second state 328, continuing from first state 322, a portion of active gripper 300 is in the process of gripping a portion of an object 320. The portion of object 320 is shown to be gripped by tooth 321 associated with finger 304. In some embodiments, pneumatic actuator 312 may rotate finger 304 about pivot 315 so that one or more teeth (e.g., tooth 321) engage with an edge of object 320. In second state 328, torsion spring 323 is subject to some degree of compression, providing a degree of mechanical compliance to finger 304. This mechanical compliance allows finger 304 to grip object 320 appropriately.

Figure 3E:
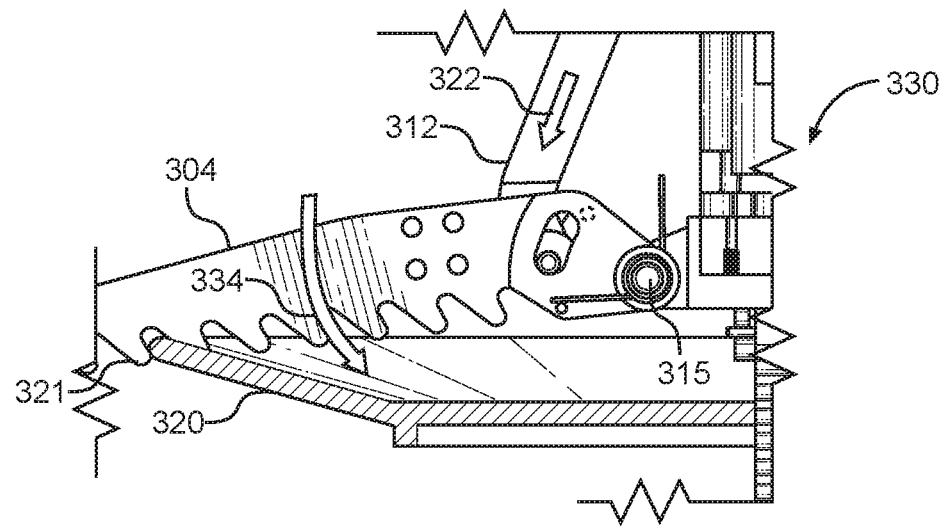
FIG. 3E is a schematic diagram depicting a third state in a sequence of operations associated with gripping an object by an embodiment of an active gripper.

FIG. 3E is a schematic diagram depicting a third state 330 in a sequence of operations associated with gripping an object by an embodiment of an active gripper such as active gripper 300. Third state 330 continues from second state 328. In third state 330, pneumatic actuator 312 exerts an additional force 332 on finger 304 to provide a locking effect on the mechanical engagement between tooth 321 and object 320. This force manifests as a rotational torque 334 on finger 304 about pivot 315. In some embodiments, rotational torque 334 bottoms out (compresses) torsion spring 323 (not shown) which, in turn, exerts a force on finger 304 that substantially locks finger 304. In some embodiments, each finger associated with active gripper 300 may be associated with one or more torsion springs that move independently of any torsion springs associated with other fingers. The sequence of first state 322, second state 328, and third state 330 illustrates an active gripping process.

In some embodiments, active gripper 300 may include one or more compliant members (e.g., spring-loaded mechanisms) associated with each combination of a finger, pivot and pneumatic actuator. These compliant members are not depicted in the drawings. The one or more compliant members limit the gripping force exerted by a gripping tooth to prevent any potential damage to an object being gripped. For example, in the absence of a compliant member if a pneumatic actuator exerts greater than a threshold amount of force, the resultant torque generated by a finger associated with the pneumatic actuator could be sufficient to damage or break an object being gripped (for example, an article of dishware made of porcelain). A compliant member absorbs additional force in excess of a threshold value via, for example, storing the excess force as potential energy via a spring compression or a spring extension, thereby preventing this excess force from being transmitted to the object being gripped and limiting the amount of force exerted on the object being gripped. This reduces the likelihood of the object being damaged by the excess force.

The discussion above for first state 322 through third state 330 can be extended to all the fingers and related mechanisms (e.g., pneumatic actuators, teeth, pivots, etc.) associated with active gripper 300 that collectively operate in this manner to grip an object. The gripping process is a collective (collaborative) effort between the different components associated with active gripper 300. During the process of gripping an object, all fingers associated with active gripper 300 are collectively moved to wrap around an object—in this sense the active gripping process does not involve any independent motion of the fingers. In other words, the motion of the fingers of an active gripper such as active gripper 300 can be described as collective motion (or coupled motion).

In some embodiments, a process of active gripping may include feedback from one or more sensors such as displacement sensors, force sensors, pressure sensors and so on that are associated with one or more fingers associated with an active gripper. These sensors provide a measure of how much force is being applied by the one or more fingers. This feedback may be used to prevent the application of excessive force by the active gripper that may damage an object being gripped. In other embodiments, mechanical force limiters (such as torsion springs or other compliant members) may be used instead of feedback sensors to limit the force being exerted by the gripper on an object being gripped.

Figure 4:
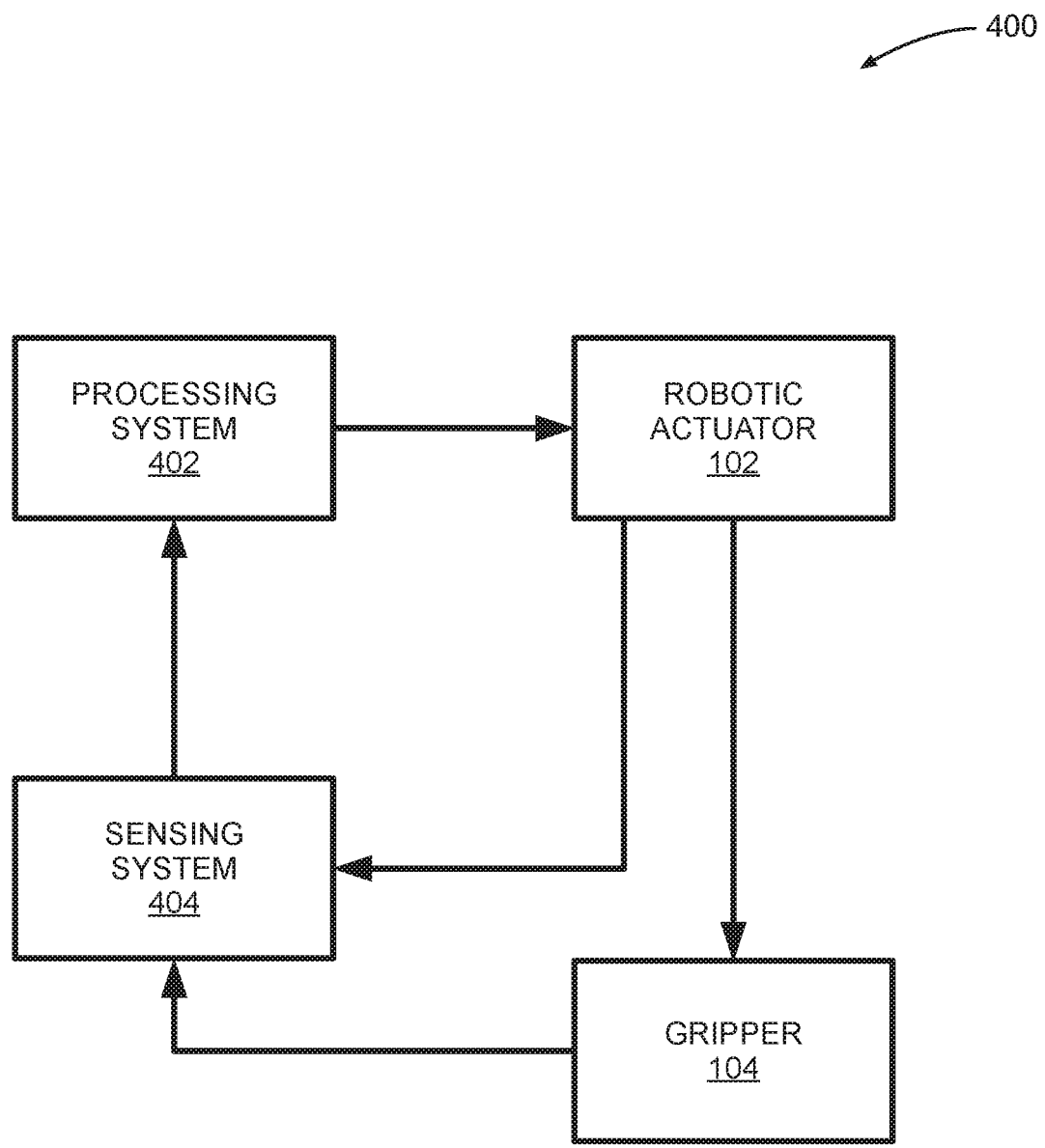
FIG. 4 is a block diagram depicting an embodiment of an object gripping system.

FIG. 4 is a block diagram depicting an embodiment of an object gripping system 400. In some embodiments, object gripping system 400 includes robotic actuator 102 mechanically coupled to gripper 104. In particular embodiments, robotic actuator 102 may be any one of a multi degree of freedom robotic arm, a gantry robot, a multi degree of freedom linear stage assembly, or some other robotic actuator.

In some embodiments, gripper 104 may be comprised of two or more fingers located around a central axis. Each finger may include one or more teeth or tooth features configured to hook or engage around an edge rim of a range of thickness, where the edge rim is associated with an object. In some embodiments, the edge rim may be perpendicular to the central axis. In other embodiments, the edge rim may be at some other angle to the edge axis.

In some embodiments, the two or more fingers may be positioned in pairs substantially opposing each other, in a circular pattern. In particular embodiments, a force applied by one finger in an opposing group of fingers is substantially opposite to a force or forces applied by an opposing finger or a group of fingers respectively. In some embodiments, the fingers may move independently of each other. In other embodiments, the motion of the fingers may be coupled. In some embodiments, all fingers may be moveable with respect to a rigid reference structure. In other embodiments, one or more fingers may be fixed with respect to a rigid reference structure while other fingers may be moveable with respect to the rigid reference structure. In some embodiments, a finger may be comprised of a single, substantially rigid member. In other embodiments, a finger may be comprised of multiple links, where the multiple links on each finger are coupled by pivot points.

In some embodiments, a process of gripping an object by a gripper may be comprised of multiple states. In one state, referred to as a "free state," the fingers associated with the gripper are passively positioned by any combination of gravitational forces or passive compliant members such as springs. In one embodiment, referred to as "passive gripping," in the free state, the gripper is moved to a position where the fingers of the gripper are pushed open by the object, thereby engaging a rim on the object with teeth or hooks on the finger. This method provides a greater degree of tolerance to error in the relative positioning between the gripper and the object to be gripped. On the other hand, if one or more actuators are used to move the fingers such that the fingers engage around an object to be gripped, then the gripping method is referred to as "active gripping."

In an active gripper design, the fingers are actively moved in the gripping direction, whereby the tooth features converge around the object. All of the above discussion regarding tooth features and finger geometry applies to the active case. In some embodiments, active gripping may not require a "locked state", which is inherently achieved by the force of the actuator and the back-driveability of the mechanism. However, unlike passive gripping, in the case of active gripping, the gripper needs to either (a) incorporate in-line compliance to prevent it from crushing the object, or (b) incorporate sensors capable of detecting the grip engagement event and stopping the gripper. Compliance for the passive gripper is achieved through independent fingers and the use of passive motion during the gripping action. In-line compliance is commonly employed by other robotic grippers, and may be achieved through pneumatic pressure, integral springs, etc. In-line compliance is inherently limiting if it is always present. On the one hand, the compliance must be sized to the object set, which means that a user must choose between handling heavy objects and fragile objects. Heavy objects require high-stiffness compliance, otherwise the user risks dropping the object. Fragile objects require low-stiffness compliance, otherwise the user risks breaking the object. Compliance must be sized to the range of sizes of objects the gripper must handle. For example, in the case of a dishware handling robot where objects are relatively fragile and heavy, and the user desires to accommodate a large range of sizes, in-line compliance would need to be locked out by a secondary device or mechanism.

Once an object to be gripped is engaged, the gripper moves away from the object. This process may allow additional motion of the fingers. When the fingers are finally constrained by the object so as to prevent motion, the object will be lifted by the gripper as the gripper continues to move. When the object is lifted by the gripper, the weight of the object can further engage the fingers against the object according to the geometry of the tooth or hook features and the geometry of the fingers. When an object is gripped and lifted, the fingers may be locked using one or more locking mechanisms such as a roller clutch and other locking mechanisms discussed herein.

Once the object is moved to the desired location, the gripper is transitioned to a "release" state. In the released state, the fingers of the gripper are actively moved in an opening direction, which forces the fingers open and disengages the teeth or hooks on the fingers with the object rim. In one embodiment, the release state is on a continuum of motion for a single actuator, which is also positioning the components between the free and locked states. In another embodiment, the release state employs an additional actuator, which is moved independently or in addition to the actuator used for locking/freeing. In yet another embodiment, the fingers of the gripper are forced open by driving the gripper against a secondary device, such as a fixture. In this embodiment, the mechanism in the gripper only needs to have two states, locked and free. A design for such an embodiment could use a simpler electromechanical device, such as an electromagnetic brake or clutch, a solenoid, a hydraulic/pneumatic piston, etc.

In some embodiments, object gripping system 400 may also include a sensing system that 404 that receives inputs from robotic actuator 102 and gripper 104. Sensing system 404 may be used to augment the functionality of gripper 104, or in the case of active gripping, sensing system 404 could be used as a way to detect the engagement state with the object to be gripped, in order to halt the motion of the gripper 104. Whether for passive or active gripping, sensing system 404 could provide a user with a confirmation that the object is present, and could supply information about the size and/or location of the object with respect to gripper 104. Sensing system 404 could also measure the gripping force, the weight of the object, or the state of secondary mechanisms inside gripper 104.

In one embodiment, the teeth on gripper 104 are equipped with sensors (that are a part of sensing system 404) such that the pressure applied to the object can be detected. Any combination of pressure-sensitive film, strain gauges and capacitive plates are possible ways to create a signal from pressure focused at one point, or in one tooth location. Such signals convert pressure to electrical signals that can be read in by a processing system (such as processing system 402) for analysis. In another embodiment, the tooth edge of a finger is compliant or movable with respect to the rest of the finger. Through deformation on the tooth side of the finger, the shape of the deformation can be inferred and therefore the object engagement position on the finger determined. Again, strain sensing or capacitance sensing as a part of sensing system 404 could detect this deformation, where strain sensing or capacitance sensing are mechanisms to measure displacement. Additionally, magnetic hall-effect sensors, position encoders or contact switches could also be used to determine relative positions or displacements. In another embodiment, the positions of the fingers associated with gripper 104 could be measured using rotary or linear encoders, or position sensors that are included in sensing system 404. Additional range sensors could be applied to gripper 104 in order to measure one or more distances from gripper 104 to the object. If the object is known, with the combination of the finger positions and distances to the object, one could infer the location of the object engagement points in each finger. Additionally, the range sensor(s) could be used to verify that the object is in the proper location, and that it is present.

In some embodiments, sensing system 404 may include an imaging system such as a camera that might provide visual data to an associated computer vision system to identify an object to be gripped or to determine a position of a gripper relative to the object to be gripped. In general, sensing system 404 includes a functionality to detect a presence of an object relative to gripper 104, and to determine a location of the object with respect to gripper 104.

In some embodiments, a combination of sensors included in sensing system 404 as discussed herein may be used to detect whether an object gripped by gripper 104 moves relative to gripper 104 after the object has been gripped; such relative motion may indicate that the object is not securely gripped. A non-secure grip may be associated with a greater risk of the object being dropped. The functionality in sensing system 404 to detect a non-secure grip is useful to reduce a risk of an object being dropped. In particular embodiments, sensing system 404 may also be configured to determine whether gripper 104 has failed to grip the object.

In some embodiments, sensing system 404 may be configured to detect whether gripper 104 has properly released a gripped object at a location where the gripped object is to be deposited. In particular embodiments, sensing system 404 may be configured to determine whether a gripped object has been unintentionally released by gripper 104.

In some embodiments, object gripping system 400 includes a processing system 402 that performs computing functions, data analysis functions, data storage functions, and other functions as discussed herein. In particular embodiments, processing system 402 may be implemented by using any combination of processors such as field-programmable gate arrays (FPGAs), digital signal processors (DSPs), microcontrollers, or any other similar processors. Other components of processing system 402 are discussed herein.

During operation, processing system 402 commands robotic actuator 102 to position gripper 104 in a vicinity of an object to be gripped. The process of positioning gripper 104 may be based on feedback provided from robotic actuator 102 or gripper 104 to processing system 402 via sensing system 404. Feedback provided to processing system 402 from sensing system 404 may include visual positioning data from an imaging system, data from position sensors, or any other kind of positioning data. Once gripper 104 is appropriately positioned, gripper 104 is commanded by processing system 402 to grip the object. Robotic actuator 102 moves gripper 104 in a first direction, towards the object. Using a passive gripping process or an active gripping process, gripper 104 grips the object. Force feedback sensors and position sensors associated with the fingers provide a measure of the displacement of the fingers and the strength of the grip. In some embodiments, processing system 402 may provide commands to gripper 104 via robotic actuator 102 to grip the object with an appropriate amount of force. Processing system 402 may then command gripper 104 to lock the fingers associated with gripper 104.

Processing system 402 then commands the combination of robotic actuator 102 and gripper 104 to manipulate the object. In some embodiments, manipulating the object might involve moving the object from a first location to a second location. In this case, the object is moved to a second location using, for example, position feedback sensors that include visual positioning data, displacement sensors (angular and linear), rate sensors (angular and linear), and so on. At the second location, processing system 402 commands gripper 104 via robotic actuator 102 to release the grip on the object, and the object is deposited at the second location.

Figure 5:
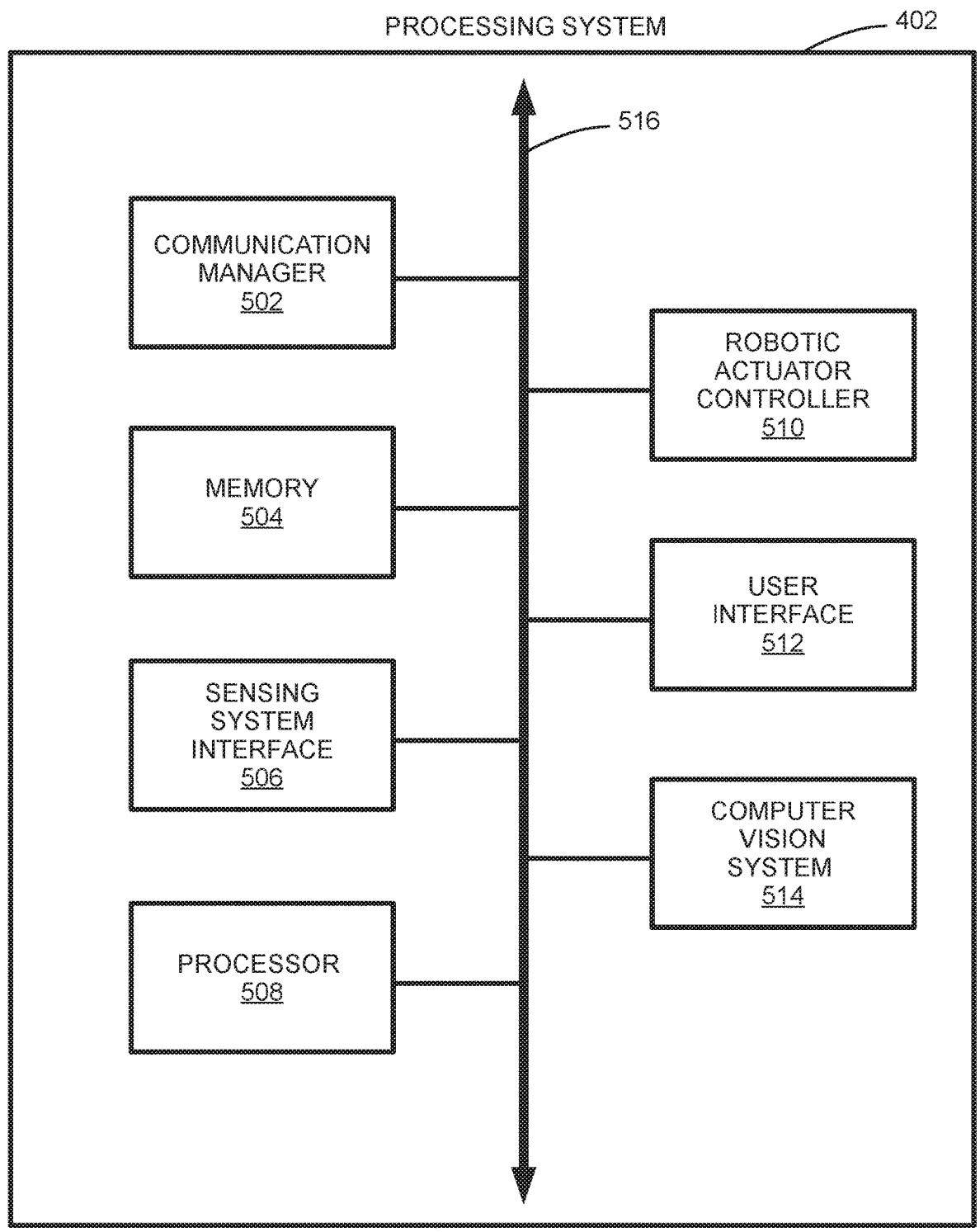
FIG. 5 is a block diagram depicting an embodiment of a processing system capable of operating a robotic actuator and gripper configured to grip and manipulate objects.

FIG. 5 is a block diagram depicting an embodiment of processing system 402 capable of operating a robotic actuator and gripper configured to grip and manipulate objects. In some embodiments, processing system 402 includes a communication manager 502 that is configured to manage communication protocols and associated communication with external peripheral devices as well as communication within other components in processing system 402. For example, communication manager 502 may be responsible for generating and maintaining the interface between processing system 402 and sensing system 404. Communication manager 502 may also manage communication between the different components within processing system 402.

In some embodiments, processing system 402 includes a memory 504 that is configured to store data associated with object gripping system 400. Data stored in memory 504 may be temporary data or permanent data. In some embodiments, memory 504 may be implemented using any combination of hard drives, random access memory, read-only memory, flash memory, and so on. In particular embodiments, data stored in memory 504 may include positioning data associated with a gripper, a robotic actuator, and an object to be gripped, data associated with an imaging system, data associated with force sensors, data associated with position sensors, and so on.

Processing system 402 may also include a sensing system interface 506 that is configured to interface with sensing system 404. Sensing system interface 506 may include, for example, an interface to receive imaging data from any associated imaging device that may be a part of sensing system 404. Sensing system interface 506 may also include data buses or data paths (e.g., serial data buses or parallel data buses) that receive sensor data from force sensors, position sensors, or other sensors associated with robotic actuator 102 or gripper 104.

In some embodiments, processing system 402 includes a computer vision system 514 that is configured to process imaging data to determine, for example, a relative position between a gripper and an object to be gripped. Computer vision system 514 may also be configured to perform image recognition functions to detect and identify an object to be gripped based on visual data provided by an imaging system.

Processing system 402 may also include a processor 508 that may be configured to perform functions that may include generalized processing functions, arithmetic functions, and so on. Processor 508 may also be configured to perform three-dimensional geometric calculations and solve navigation equations in order to determine relative positions, trajectories, and other motion-related and position-related parameters associated with manipulating an object. Processor 508 may also be configured to maintain forces exerted by fingers associated with gripper 104 below a predetermined threshold to prevent damaging or breaking an object being gripped.

In some embodiments, processing system 402 includes a robotic actuator controller 510 that is configured to output actuation commands to robotic actuator 102 and gripper 104. The commands output by robotic actuator controller 510 may include positioning commands, finger movement commands, finger lock/unlock commands, and so on.

A user interface 512 may be included in processing system 402. In some embodiments, user interface 512 is configured to receive commands from a user or display information to the user. For example, commands received from a user may be basic on/off commands, and may include variable operational speeds. Information displayed to a user by user interface 512 may include, for example, system health information and diagnostics. User interface 512 may include interfaces to one or more switches or push buttons, and may also include interfaces to touch-sensitive display screens.

Figure 6:
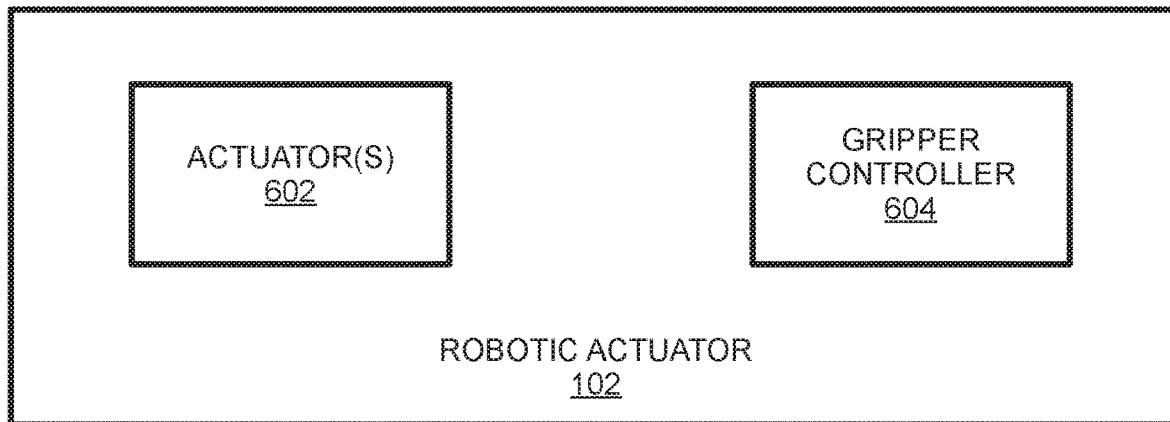
FIG. 6 is a block diagram depicting an embodiment of a robotic actuator.

FIG. 6 is a block diagram depicting an embodiment of a robotic actuator 102. In some embodiments, robotic actuator 102 includes one or more actuators 602 that may be any combination of electrical motors, pneumatic actuators, hydraulic actuators, and so on, configured to generate motion in robotic actuator 102 or gripper 104. Robotic actuator 102 may also include a gripper controller 604 that is configured to receive commands from processing system 402 and relay these commands to gripper 104. In some embodiments, gripper controller 604 may be an electromechanical interface that transmits both electrical and mechanical signals from robotic actuator 102 to gripper 104.

Figure 7:
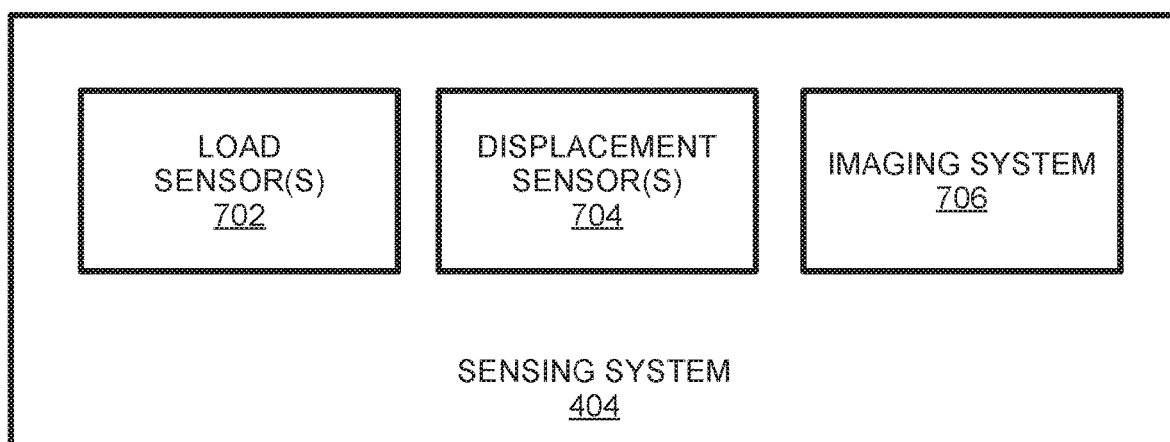
FIG. 7 is a block diagram depicting an embodiment of a sensing system.

FIG. 7 is a block diagram depicting an embodiment of a sensing system 404. In some embodiments, sensing system 404 includes one or more load sensors 702 configured to measure force, such as forces exerted by one or more fingers on an object being gripped. An example of a load sensor is a load cell. Sensing system 404 may also include one or more displacement sensors 704 that are configured to measure any combination of linear and angular displacements, including linear and angular rates. Displacement sensors 704 may be used to measure displacements of one or more fingers in gripper 104, or to measure displacements of robotic actuator 102. An example of a displacement sensors is a strain gauge, while accelerometers and gyroscopes may be used to measure linear and angular accelerations respectively.

In some embodiments, sensing system 404 may include an imaging system 706 that is configured to capture visual data associated with robotic actuator 102, gripper 104, and an object to be gripped. Imaging system 706 may be implemented using a camera system, for example. Outputs from imaging system 706 may be used by processing system 402 to determine, for example, spatial positioning coordinates associated with robotic actuator 102, gripper 104, and an object to be gripped. Outputs from imaging system 706 may also be processed by image recognition algorithms running on processing system 402 to detect and identify one or more objects to be gripped.

Figure 8A:
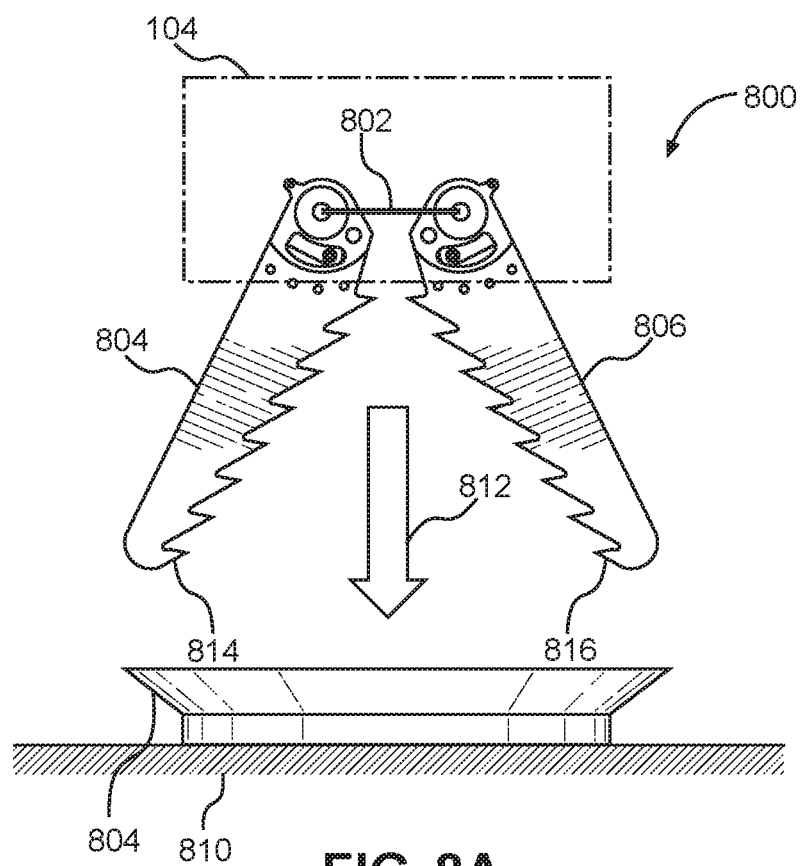
FIGS. 8A-8F are schematic diagrams depicting a sequence of operations associated with gripping an object by an embodiment of a gripper.

FIG. 8A is a schematic diagram depicting a sequence of operations 800 associated with gripping an object by an embodiment of a gripper such as gripper 104. In some embodiments, gripper 104 includes a first finger 804 and a second finger 806, where first finger 804 is mechanically coupled to second finger 806 via a mechanical coupling 802. First finger 804 and second finger 806 are each shown to have a plurality of teeth, for example a tooth 814 is associated with finger 804, and tooth 816 is associated with finger 806. In some embodiments, mechanical coupling 802 may include any combination of rigid support structures, springs, locking mechanisms (e.g., mechanical clutches such as roller clutches), and other mechanical coupling devices as discussed herein. In some embodiments, mechanical coupling 802 serves to hold each of finger 804 and finger 806 in an equilibrium position as discussed herein.

In some embodiments, gripper 104 may be commanded by processing system 402 to grip an object—in this case an object 808—resting on a work surface 810. To grip object 808, gripper 104 moves in a first direction 812 towards object 808, from an initial position where there is no physical contact between any part of gripper 104 and object 808. Gripper 104 may be moved in first direction 812 via robotic actuator 102. The description of the sequence of operations 800 associated with gripping object 808 continues in the description of FIG. 8B.

Figure 8B:
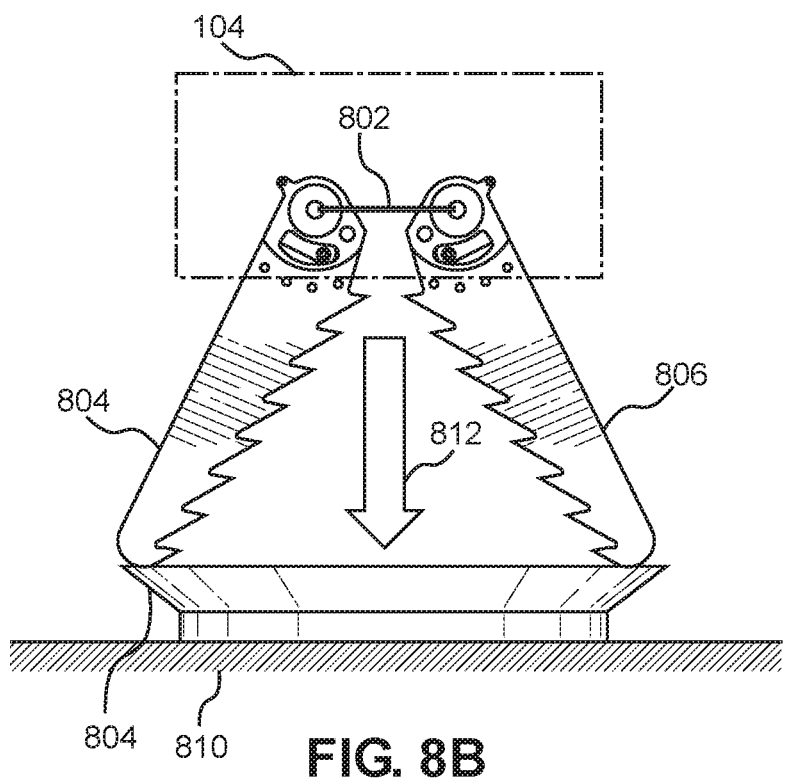

FIG. 8B is a continued description of the sequence of operations 800 associated with gripping an object by gripper 104. Gripper 104 continues moving in first direction 812 towards object 808 on work surface 810, to the point where each of finger 804 and finger 806 touches object 808 as shown in FIG. 8B. Mechanical coupling 802 continues to hold each of finger 804 and finger 806 in an equilibrium position. The description of the sequence of operations 800 associated with gripping object 808 continues in the description of FIG. 8C.

Figure 8C:
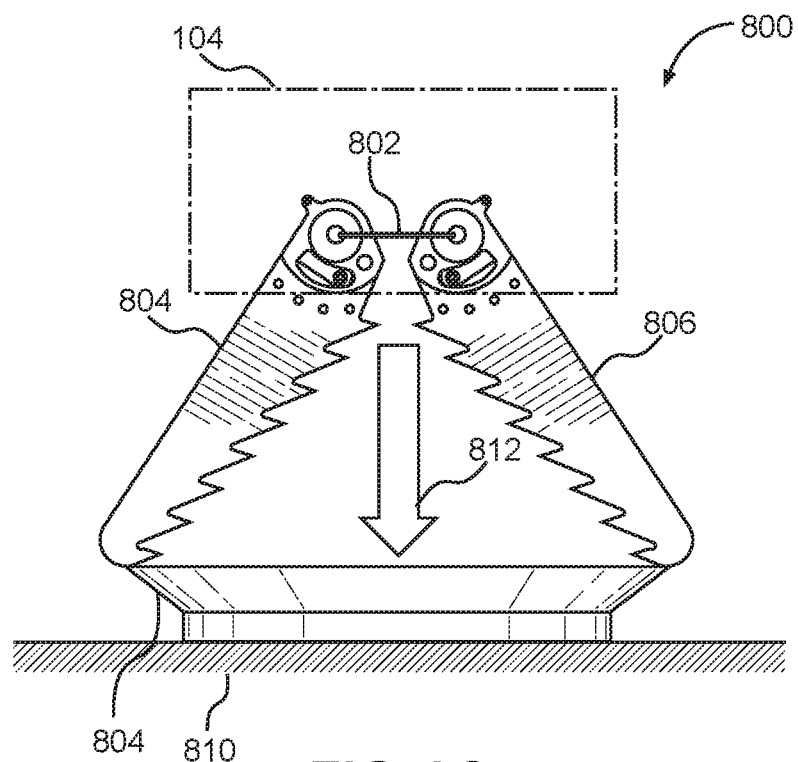

FIG. 8C is a continued description of the sequence of operations 800 associated with gripping an object by gripper 104. Gripper 104 continues moving in first direction 812. Since each of finger 804 and finger 806 are in physical contact with object 808 on work surface 810, each of finger 804 and finger 806 are pushed apart from each other (i.e., finger 804 and finger 806 move apart from each other) due to a combination of physical forces exerted on each of finger 804 and finger 806 by object 808 and a physical constraint associated with object 808. Mechanical coupling 802 accordingly adjusts to the combined motion of finger 804 and finger 806 via compression or extension motion in one or more spring mechanisms associated with mechanical coupling 802, as discussed herein. In some embodiments, finger 804 and finger 806 move apart against mechanical spring tension in mechanical coupling 802. The description of the sequence of operations 800 associated with gripping object 808 continues in the description of FIG. 8D.

Figure 8D:
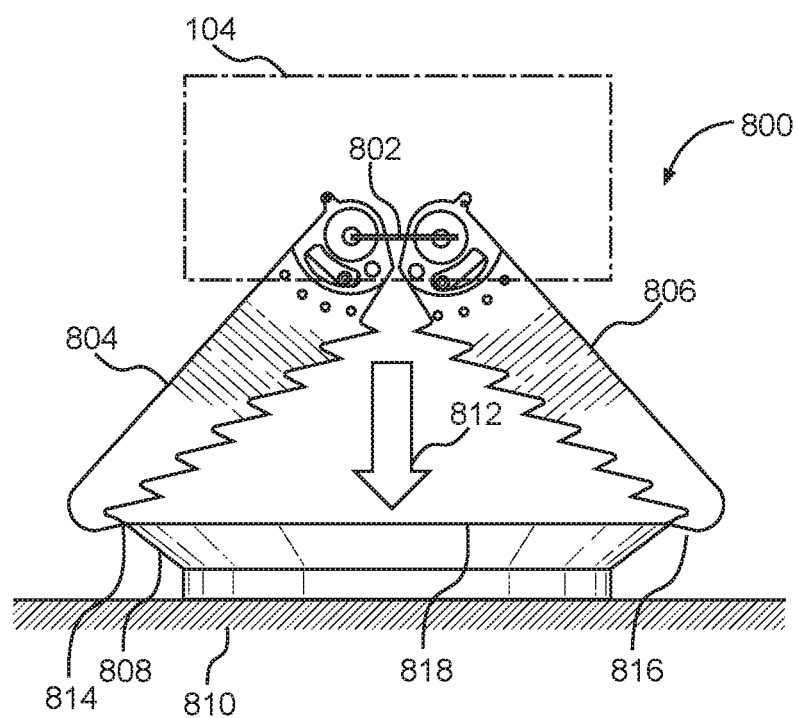

FIG. 8D is a continued description of the sequence of operations 800 associated with gripping an object by gripper 104. Gripper 104 continues moving in first direction 812, and finger 804 and finger 806 continue to be forced apart due to mechanical interaction with object 808 on work surface 810. FIG. 8D shows a point where a tip of tooth 814 and a tip of tooth 816 each makes contact with an edge 818 of object 808. The description of the sequence of operations 800 associated with gripping object 808 continues in the description of FIG. 8E.

Figure 8E:
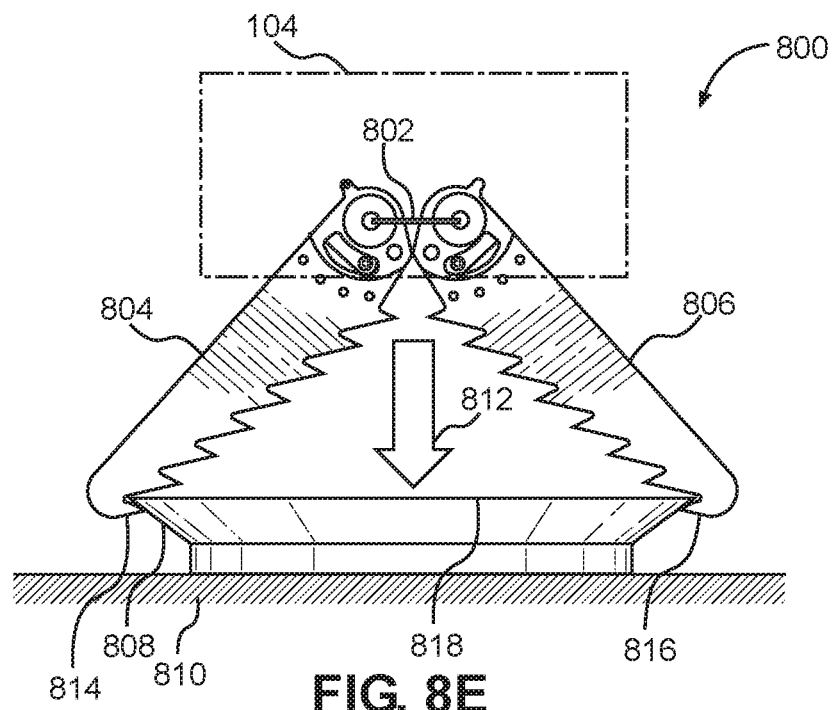

FIG. 8E is a continued description of the sequence of operations 800 associated with gripping an object by gripper 104. Gripper 104 continues moving in first direction 812, and due to forces (such as spring tension) generated in mechanical coupling 802, finger 804 and finger 806 may close slightly such that edge 818 of object 808 on work surface 810 is gripped by a combination of finger 814 and finger 816. In some embodiments, this gripping process is achieved by a combination of forces generated between object 808, tooth 814, and tooth 816, and forces (such as spring tension forces) generated by mechanical coupling 802. At this time, mechanical coupling 802 may be locked by commands from processing system 402 to prevent any further motion of finger 804 or finger 806. The description of the sequence of operations 800 associated with gripping object 808 continues in the description of FIG. 8F.

Figure 8F:
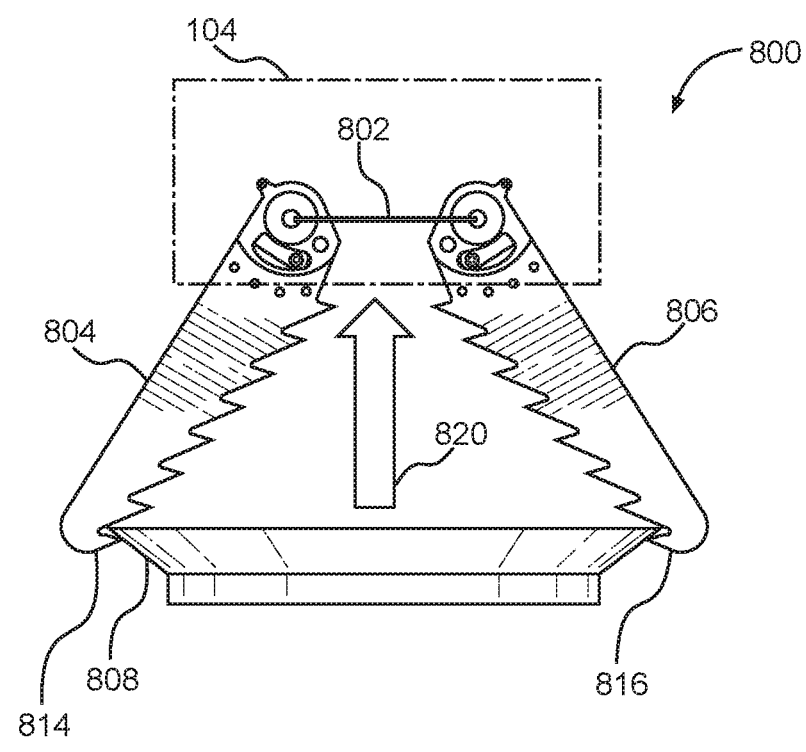

FIG. 8F is a continued description of the sequence of operations 800 associated with gripping an object by gripper 104. Once object 808 has been gripped by tooth 814 and tooth 816, processing system 102 may command gripper 104 to move in a second direction 820 that is substantially opposite to first direction 812. Since object 808 is gripped and locked, object 808 is lifted above work surface 810 by a combination of finger 814 and finger 816. FIG. 8F also shows mechanical coupling 802 in a locked state. In some embodiments, the weight of object 808 serves to enhance the grip (i.e., the gripping forces) exerted by gripper 104 on object 808.

In some embodiments, any spring mechanisms associated with mechanical coupling 802 (for example, spring 224 associated with passive gripper 200) serve to increase a rate (or speed) at which object 808 is gripped by gripper 104 relative to an embodiment that does not use any spring mechanism. In an absence of any spring mechanism associated with mechanical coupling 802, either or both of finger 814 or finger 816 might slide off (or "bounce" off) object 808 rather than engaging with object 808 during a gripping process. Such occurrences may also be observed during operation of an active gripper (such as active gripper 300) if the associated teeth are driven (or moved) too quickly by actuators such as pneumatic actuator 312. Including one or more spring mechanisms in mechanical coupling 802 prevents such missed gripping attempts, thereby increasing operation speed of gripper 104 while allowing an active gripper to be driven faster relative to a gripping speed achievable in the absence of any spring mechanism.

Figure 9A:
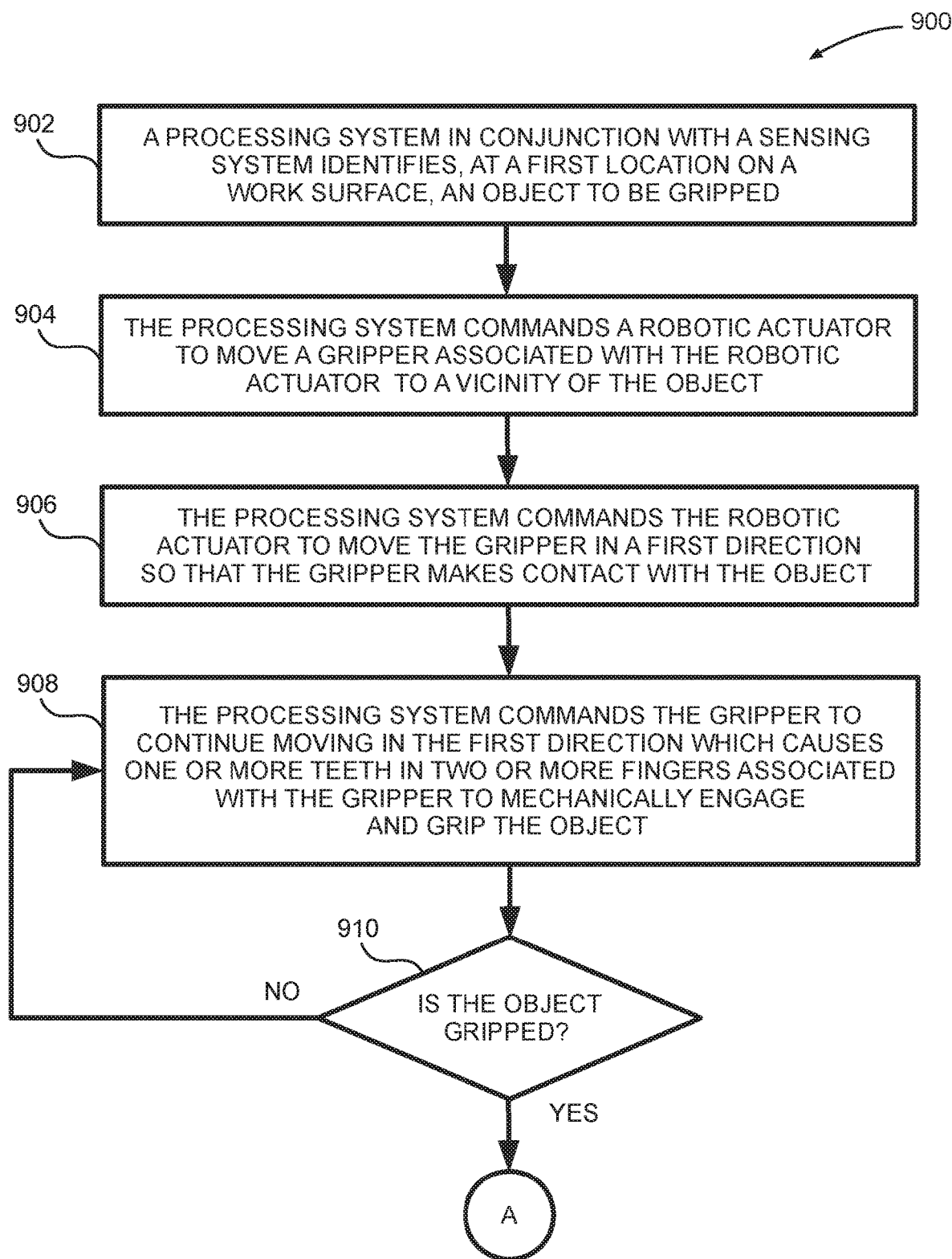
FIGS. 9A and 9B are flow diagrams depicting an embodiment of a method for gripping an object by a passive gripper.

FIG. 9A is a flow diagram depicting an embodiment of a method 900 for gripping an object by a passive gripper. At 902, a processing system (such as processing system 402) in conjunction with a sensing system (such as sensing system 404) identifies, at a first location on a work surface (such as work surface 112), an object to be gripped. In some embodiments, the object to be gripped is an object such as object 110. At 904, the processing system commands a robotic actuator (such as robotic actuator 102) to move a gripper (such as gripper 104) associated with the robotic actuator to a vicinity of the object. Next, at 906, the processing system commands the robotic actuator to move the gripper in a first direction so that the gripper makes contact with the object. This step is similar to the scenario depicted in FIG. 8B. At 908, the processing system commands the gripper to continue moving in the first direction which causes one or more teeth in two or more fingers associated with the gripper to mechanically engage and grip the object. This step is similar to the sequence of events depicted in FIGS. 8C, 8D, and 8E. In some embodiments, a physical interaction between the gripper and the object causes the one or more fingers to be moved apart or as described herein. In particular embodiments, the one or more fingers are pushed apart against spring tension. At 910, the method checks to determine whether the object is gripped. In some embodiments, this check is performed by processing system 402 responsive to inputs from sensing system 404. The inputs provided to processing system 402 by sensing system 404 may include data from any combination of sensors such as pressure sensors, force sensors, displacement sensors, and other sensors as described herein. If the object is not gripped, the method returns to 908. If the object is gripped, the method goes to A, with a continued description in FIG. 9B.

Figure 9B:
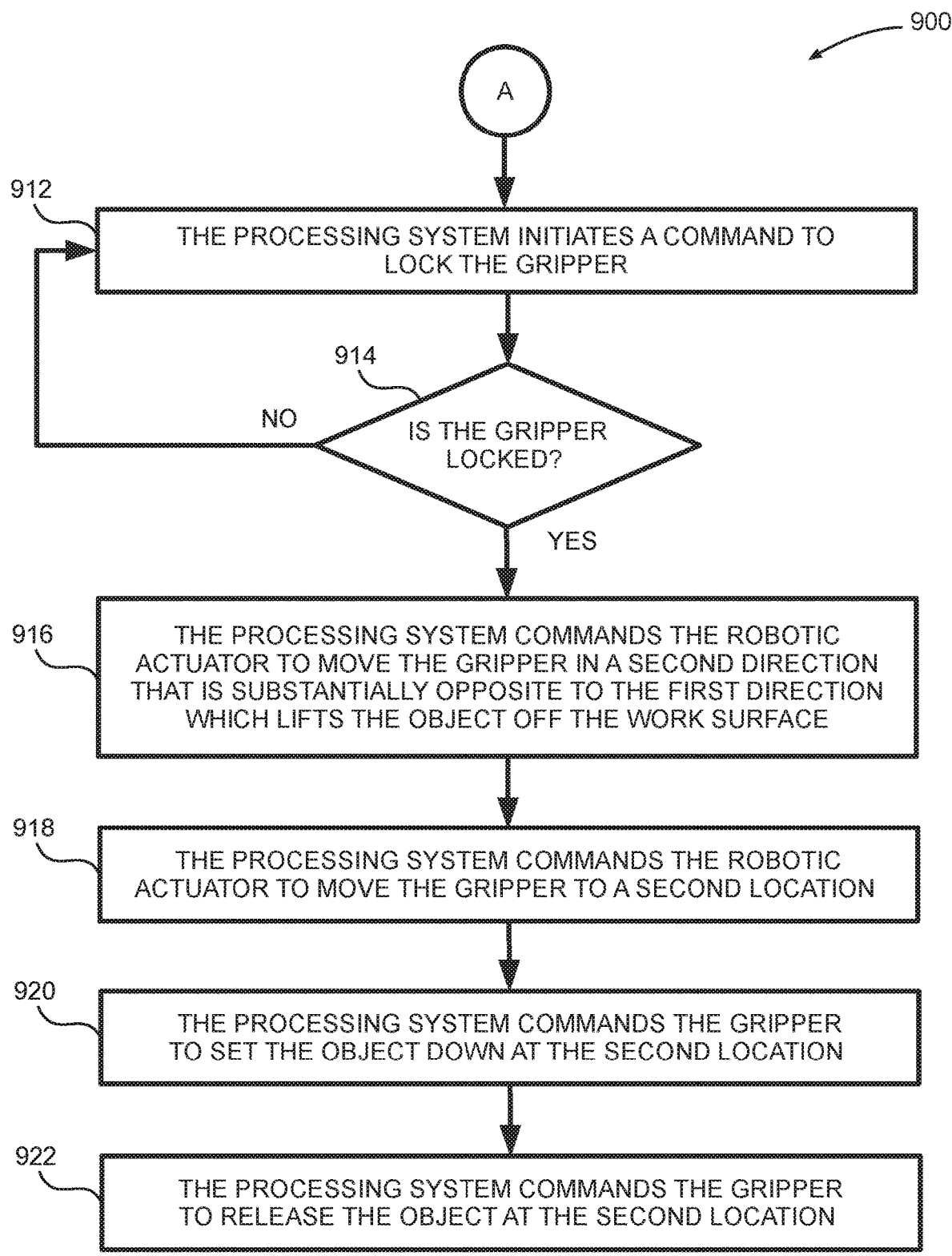

FIG. 9B is a continued description of method 900. Starting at A, the method goes to 912, where the processing system initiates a command to lock the gripper. In some embodiments, the process of locking the gripper can be interpreted as a transition from a free state (where the fingers are able to move under the influence of external forces) to a locked state, where any motion of the fingers is substantially constrained by one or more locking mechanisms. In some embodiments, a locking mechanism is configured to lock the fingers of the gripper, preventing movement of at least one of the fingers in at least one direction. In one particular embodiment, the locking mechanism is configured to lock each finger associated with the gripper independently of other fingers associated with the gripper. In another embodiment, the locking mechanism simultaneously locks all fingers associated with the gripper.

In a locked state, the fingers are prevented from moving in at least one direction, through the use of a locking mechanism. For example, in one design, a brake pad surface is forced against a surface on one or more fingers. In this case, the brake pad and fingers can be designed such that engagement of the braking surface can be applied on multiple fingers at the same time with a single brake part, where each finger is at a different position within its range of motion, and the fingers move independently. In the brake-pad design, motion on each finger is resisted in both directions by the friction of the braking element. It is preferable in such a design to position the brake pad surface such that it is self-locking, meaning the applied loads from the dish object to the finger tooth feature cause additional clamping force in the brake, which increases its holding force.

Alternate designs could position the braking elements such that they are prone to separation, which reduces braking force. In another embodiment of the brake-pad design, the braking surfaces are toothed in order to increase holding force. A further embodiment would be the use of ratcheting teeth, such that motion in one direction is allowed, whereas in the other direction it is restricted.

In another design, the motion of the fingers can be restricted through the use of a roller clutch component, whereby a cylindrical device is wedged between a cylindrical feature coupled to the finger and a reference surface. Such a cylindrical device prevents rotation of the finger in one direction, but allows rotation in the other, through a wedging effect. A roller clutch (or some other locking mechanism) can be used to simultaneously lock all fingers, with each finger possibly being at a different location in its travel. The roller clutch design optionally may employ the use of one or more springs to force the wedge roller in the wedging direction. There may also be a retention feature on a lower reference surface, which keeps the roller contained in the mechanism when it is not wedged against the finger cylindrical surface. The reference surface, which the roller wedges against, may be moveable relative to other reference surfaces. This would allow the mechanism to overcome any compressibility in the components that might otherwise keep the device in the locked state. In the brake-pad embodiment, locking is defined by contact or lack-thereof between adjacent brake surfaces. Compressibility within the materials of the brake-pads, or in the mechanism itself, provides a tolerance range for which the mechanism is between a locked state and a free state. If the mechanism is at maximum braking force at position x and completely free at position y, between position x and position y, there will be variable braking force. However, in the roller-clutch design, the mechanism has more of a binary state. The mechanism is locked at any position less than a specified position z that may be determined as a design parameter, and is free at any position greater than z, assuming the component materials have been selected to minimize compression (this is preferred).

With the gripper in a locked state, the object can be moved quickly and with fewer constraints. In an unlocked gripper, which is designed to be capable of passive gripping as described herein, the finger mechanisms may have motion coupling, which would allow the object to move relative to the fixed parts of the gripper when the object is gripped. This behavior is undesirable if the object is to be moved quickly, or if a user wishes to reorient the object with respect to gravity. Locking the fingers as described overcomes this shortcoming. In the case of active gripping, coupling between the fingers might be avoided, and therefore locking the fingers could be unnecessary. Once the object is moved to the desired location, the gripper is transitioned to a "released" state. In the released state, the fingers of the gripper are actively moved in an opening direction, which forces the fingers open and disengages the teeth or hooks on the fingers with the object rim (or edge). In one embodiment, the release state is on a continuum of motion for a single actuator, which is also positioning the components between the free and locked states.

In another embodiment, the release state employs an additional actuator, which is moved independently or in addition to the actuator used for locking/freeing. In yet another embodiment, the fingers of the gripper are forced open by driving the gripper against a secondary device, such as a fixture. In this embodiment, the mechanism in the gripper only needs to have two states, locked and free. A design for such an embodiment could use a simpler electromechanical device, such as an electromagnetic brake or clutch, a solenoid, a hydraulic/pneumatic piston, etc. Alternatively, the previous discussion of a three-state gripper requires more accurate position control, particularly of the release motion. In a two-state gripper, position control of the release is achieved by the positioning system.

Returning back to the description of FIG. 9B, at 914, the method checks to if the gripper is locked. This function may be accomplished via feedback from the locking mechanism to the processing system. If at 914 the method 900 determines that the gripper is not locked, then the method returns back to 912. If at 914 the method determines that the gripper is locked, then the method goes to 916, where the processing system commands the robotic actuator to move the gripper in a second direction that is substantially opposite to the first direction which lifts the object off the work surface. In some embodiments, the second direction is similar to second direction 820. Next, at 918, the processing system commands the robotic actuator to move the gripper to a second location. This movement of the object may correspond to manipulating the object by the gripper. In some embodiments, other kinds of object manipulation methods (such as reorienting the object in three-dimensional space) may be implemented instead of or in addition to moving the object to a second location. At 920, the processing system commands the gripper to set the object down at the second location, and at 922, the processing system commands the gripper to release the object at the second location. This completes the process of gripping the object, moving the object from the first location to the second location, and depositing the object at the second location via passive gripping.

Figure 10A:
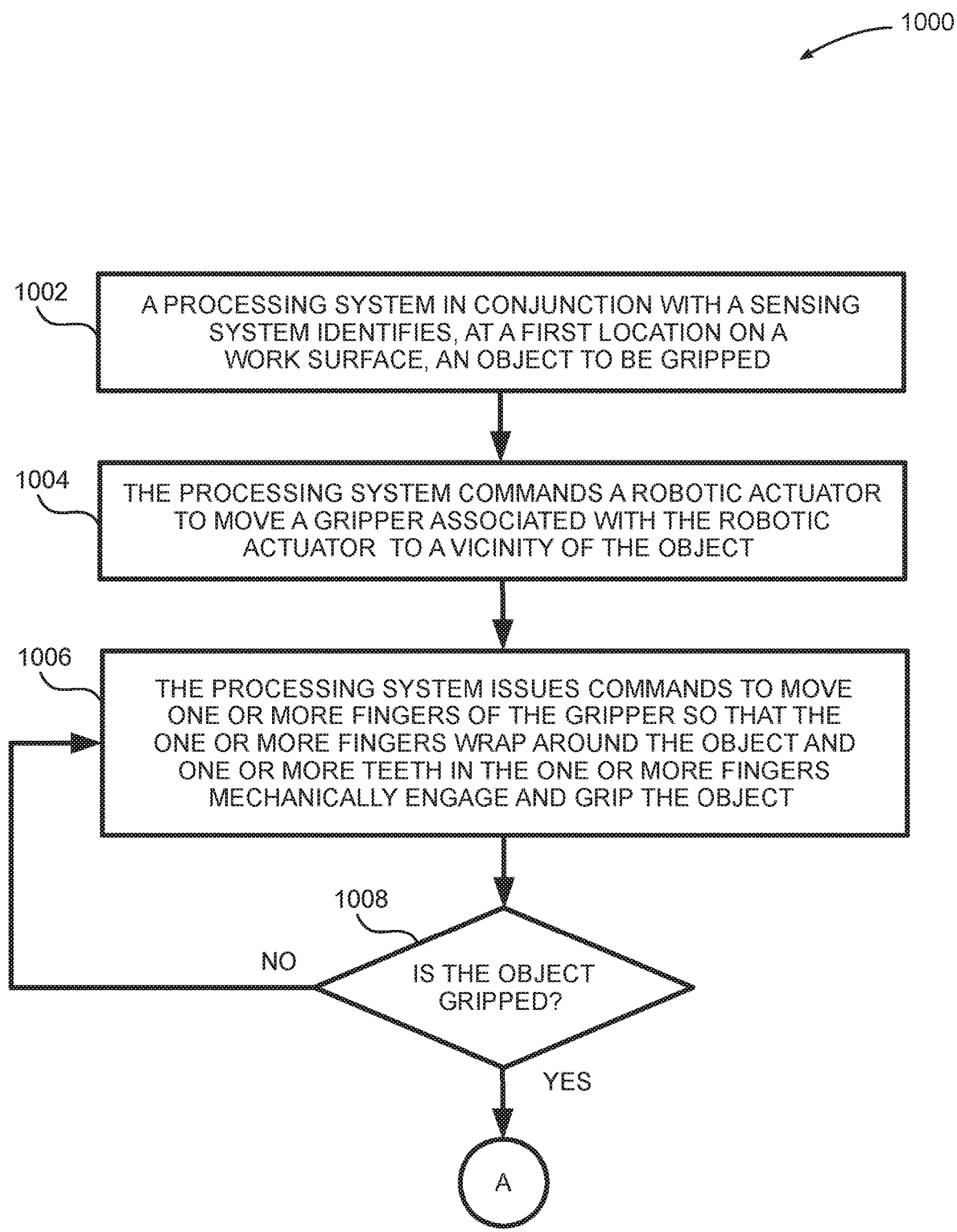
FIGS. 10A and 10B are flow diagrams depicting an embodiment of a method for gripping an object by an active gripper.

FIG. 10A is a flow diagram depicting an embodiment of a method 1000 for gripping an object by an active gripper. At 1002, a processing system (such as processing system 402) in conjunction with a sensing system (such as sensing system 404) identifies, at a first location on a work surface (such as work surface 112), an object to be gripped. In some embodiments, the object to be gripped is an object such as object 110. At 1004, the processing system commands a robotic actuator (such as robotic actuator 102) to move a gripper (such as gripper 104) associated with the robotic actuator to a vicinity of the object. Next, at 1006, the processing system issues commands to move one or more fingers of the gripper so that the one or more fingers wrap around the object and one or more teeth in the one or more fingers mechanically engage and grip the object. In some embodiments, the process of moving one or more fingers of the gripper is the process of active gripping, where the one or more fingers may each be moved using an actuator such as a pneumatic actuator. At 1008, the method checks to determine whether the object is gripped. In some embodiments, this check is performed by processing system 402 responsive to inputs from sensing system 404. The inputs provided to processing system 402 by sensing system 404 may include data from any combination of sensors such as pressure sensors, force sensors, displacement sensors, and other sensors as described herein. If the object is not gripped, the method returns to 1006. If the object is gripped, the method goes to A, with a continued description in FIG. 10B.

Figure 10B:
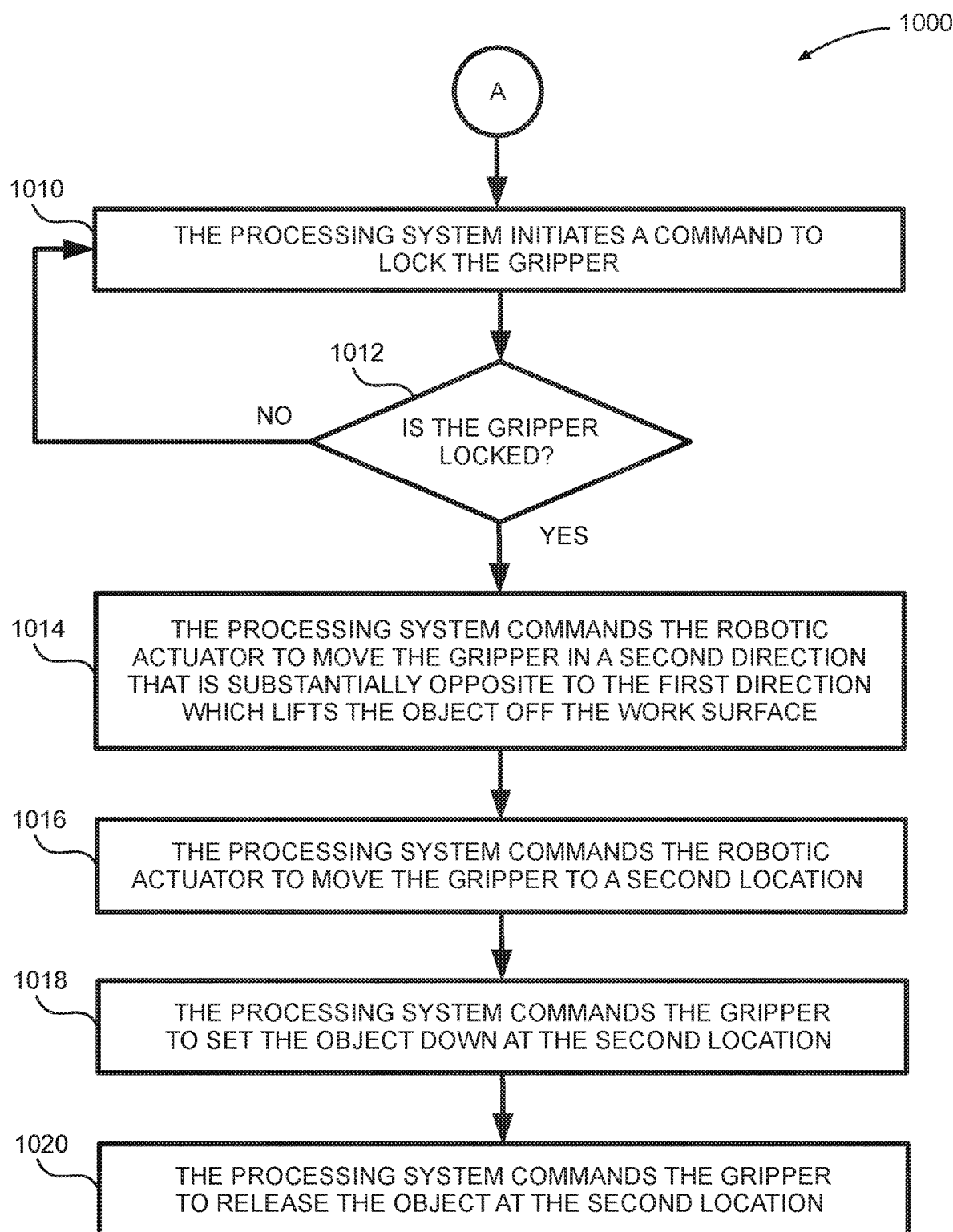

FIG. 10B is a continued description of method 1000. Starting at A, the method 1000 goes to 1010, where the processing system initiates a command to lock the gripper. In some embodiments, the process of locking the gripper can be interpreted as a transition from a free state (where the fingers are able to move under the influence of external forces) to a locked state (where any motion of the fingers is substantially constrained by one or more locking mechanisms).

At 1012, the method 1000 checks to see if the gripper is locked. This function may be accomplished via feedback from the locking mechanism to the processing system. If at 1012 the method determines that the gripper is not locked, then the method returns to 1010. If at 1012 the method determines that the gripper is locked, then the method goes to 1014, where the processing system commands the robotic actuator to move the gripper in a second direction that is substantially opposite to the first direction which lifts the object off the work surface. In some embodiments, the second direction is similar to second direction 820. Next, at 1016, the processing system commands the robotic actuator to move the gripper to a second location. This movement of the object may correspond to manipulating the object by the gripper. In some embodiments, other kinds of object manipulation methods may be implemented instead of or in addition to moving the object to a second location. At 1018, the processing system commands the gripper to set the object down at the second location, and at 1020, the processing system commands the gripper to release the object at the second location. This completes the process of gripping the object, moving the object from the first location to the second location, and depositing the object at the second location via active gripping.

While various embodiments of the present disclosure are described herein, it should be understood that they are presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the described exemplary embodiments, but should be defined only in accordance with the following claims and their equivalents. The description herein is presented for the purposes of illustration and description. It is not intended to be exhaustive or to limit the disclosure to the precise form disclosed. Many modifications and variations are possible in light of the disclosed teaching. Further, it should be noted that any or all of the alternate implementations discussed herein may be used in any combination desired to form additional hybrid implementations of the disclosure.

The invention claimed is:

1. An apparatus comprising:
a first rigid finger having a pivoted end, a distal end, and a plurality of teeth, the first rigid finger mechanically coupled to a first pivot at its pivoted end; and
a second rigid finger having a pivoted end, a distal end, and a plurality of teeth, the second rigid finger mechanically coupled to a second pivot at its pivoted end;
wherein the first rigid finger and the second rigid finger are mechanically coupled to their respective first and second pivots such that the distal end of the first rigid finger and the distal end of the second rigid finger move apart from each other as the first and second rigid fingers rotate about their respective first and second pivots in response to contact between the first and second rigid fingers and an article of dishware that is on a surface such that, thereafter, a rim of the article of dishware that is on the surface is engaged between two adjacent teeth of the first rigid finger and between two adjacent teeth of the second rigid finger and a tooth of the two adjacent teeth of the first rigid finger and a tooth of the two adjacent teeth of the second rigid finger engage under the rim of the article of dishware when the first rigid finger and the second rigid finger are moved in a first direction towards the surface and at least a portion of the first rigid finger and at least a portion of the second rigid finger are in contact with the rim of the article of dishware, and wherein the first rigid finger and the second rigid finger are configured to grip the article of dishware when the first rigid finger and the second rigid finger are moved in a second direction that is away from the surface, wherein the plurality of teeth of the first rigid finger and the plurality of teeth of the second rigid finger are configured such that, when engaged under the rim of the article of dishware, the weight of the article of dishware against the engaged teeth of the first and second rigid fingers causes the first and second rigid fingers and the engaged teeth to increase the force of the grip on the article of dishware when the article of dishware is lifted off the surface in response to the first rigid finger and the second rigid finger being moved in the second direction and the weight of the article of dishware against the engaged teeth of the first and second rigid fingers causes the first and second rigid fingers and the engaged teeth to maintain the grip on the article of dishware while the article of dishware is held off the surface.

2. The apparatus of claim 1, wherein the first rigid finger and the second rigid finger are configured to move independently of each other.

3. The apparatus of claim 1, wherein the first rigid finger and the second rigid finger are each configured to move via a mechanical coupling, and wherein the movement of the first rigid finger and the second rigid finger includes the first rigid finger and the second rigid finger moving collectively.

4. The apparatus of claim 1, wherein the first rigid finger and the second rigid finger are each configured to move passively, wherein the passive movement is initiated by gravity, contact of the first rigid finger or the second rigid finger with the article of dishware, or at least one spring mechanism.

5. The apparatus of claim 1, wherein at least one of the first rigid finger or the second rigid finger is removable independently of the other finger.

6. The apparatus of claim 1, further comprising a locking mechanism configured to lock the first rigid finger or the second rigid finger by preventing movement of the first rigid finger or the second rigid finger in at least one direction.

7. The apparatus of claim 6, wherein the locking mechanism is configured to lock the first rigid finger or the second rigid finger independently of the second rigid finger or the first rigid finger respectively.

8. The apparatus of claim 6, wherein the locking mechanism is a roller clutch configured to simultaneously lock the first rigid finger and the second rigid finger.

9. The apparatus of claim 1, further comprising a spring mechanism coupled to at least one of the first rigid finger or the second rigid finger.

10. The apparatus of claim 9, wherein the spring mechanism is configured to increase a speed of gripping the article of dishware relative to a speed of gripping the article of dishware in an absence of the spring mechanism.

11. The apparatus of claim 1, further comprising at least one sensor configured to measure at least one of force, displacement, pressure, or position associated with the first rigid finger or the second rigid finger.

12. The apparatus of claim 11, wherein data from the at least one sensor is used to limit a force exerted on the article of dishware by the first rigid finger or the second rigid finger.

13. The apparatus of claim 1, further comprising a computer vision system configured to process visual data from an imaging system to detect and identify an article of dishware to be gripped.

14. The apparatus of claim 13, wherein the computer vision system determines a position of the article of dishware relative to the first rigid finger and the second rigid finger.

15. The apparatus of claim 1, further comprising a sensing system configured to determine a position of the article of dishware relative to a position of the first rigid finger or the second rigid finger.

16. The apparatus of claim 15, wherein the sensing system is further configured to detect whether the gripped article of dishware moves relative to either the first rigid finger or the second rigid finger.

17. An apparatus comprising:
a first rigid finger having a pivoted end, a distal end, and a plurality of teeth, the first rigid finger mechanically coupled to a first pivot at its pivoted end; and
a second rigid finger having a pivoted end, a distal end, and a plurality of teeth, the second rigid finger mechanically coupled to a second pivot at its pivoted end;
wherein the first rigid finger and the second rigid finger are mechanically coupled to their respective first and second pivots such that the distal end of the first rigid finger and the distal end of the second rigid finger move apart from each other as the first and second rigid fingers rotate about their respective first and second pivots in response to contact between the first and second rigid fingers and an article of dishware that is on a surface such that, thereafter, a rim of the article of dishware that is on the surface is engaged between two adjacent teeth of the first rigid finger and between two adjacent teeth of the second rigid finger and a tooth of the first rigid finger and a tooth of the second rigid finger engage under the rim of the article of dishware when the first rigid finger and the second rigid finger are moved in a first direction towards the surface and at least a portion of the first rigid finger and at least a portion of the second rigid finger are in contact with the rim of the article of dishware, and wherein the first rigid finger and the second rigid finger are configured to grip the article of dishware when the first rigid finger and the second rigid finger are moved in a second direction that is away from the surface, wherein the plurality of teeth of the first rigid finger and the plurality of teeth of the second rigid finger are configured such that, when engaged under the rim of the article of dishware, the weight of the article of dishware against the engaged teeth of the first and second rigid fingers imparts rotational forces on the first and second rigid fingers about their respective first and second pivots while the article of dishware is held off the surface in response to the first rigid finger and the second rigid finger being moved in the second direction.

18. The apparatus of claim 17, wherein the first rigid finger and the second rigid finger are configured to move independently of each other.

19. The apparatus of claim 17, wherein the first rigid finger and the second rigid finger are each configured to move passively, wherein the passive movement is initiated by gravity, contact of the first rigid finger or the second rigid finger with the article of dishware, or at least one spring mechanism.

20. The apparatus of claim 17, further comprising a locking mechanism configured to lock the first rigid finger or the second rigid finger by preventing movement of the first rigid finger or the second rigid finger in at least one direction.

21. The apparatus of claim 20, wherein the locking mechanism is configured to lock the first rigid finger or the second rigid finger independently of the second rigid finger or the first rigid finger respectively.

22. The apparatus of claim 20, wherein the locking mechanism is a roller clutch configured to simultaneously lock the first rigid finger and the second rigid finger.

23. The apparatus of claim 17, further comprising a spring mechanism coupled to at least one of the first rigid finger or the second rigid finger.

24. The apparatus of claim 23, wherein the spring mechanism is configured to increase a speed of gripping the article of dishware relative to a speed of gripping the article of dishware in an absence of the spring mechanism.

25. The apparatus of claim 17, further comprising at least one sensor configured to measure at least one of force, displacement, pressure, or position associated with the first rigid finger or the second rigid finger.

* * * * *